US012594968B2

(12) United States Patent
Shinoda et al.

(10) Patent No.: US 12,594,968 B2
(45) Date of Patent: Apr. 7, 2026

(54) VEHICLE DRIVING SWITCHING DEVICE, VEHICLE DRIVING SYSTEM, AND VEHICLE DRIVING SWITCHING METHOD

(71) Applicant: DENSO CORPORATION, Kariya-city (JP)

(72) Inventors: Keisuke Shinoda, Nisshin-city (JP); Syohei Fujii, Nisshin-city (JP); Jingyu Xiang, Nisshin-city (JP); Atsushi Baba, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 246 days.

(21) Appl. No.: 17/658,065

(22) Filed: Apr. 5, 2022

(65) Prior Publication Data

US 2022/0227398 A1 Jul. 21, 2022

Related U.S. Application Data

(63) Continuation of application No. PCT/JP2020/038375, filed on Oct. 9, 2020.

(30) Foreign Application Priority Data

Oct. 9, 2019 (JP) ................................. 2019-186267

(51) Int. Cl.
*B60W 60/00* (2020.01)
*B60W 50/14* (2020.01)

(52) U.S. Cl.
CPC ........ *B60W 60/0053* (2020.02); *B60W 50/14* (2013.01); *B60W 2050/146* (2013.01); (Continued)

(58) Field of Classification Search
CPC ............. B60W 60/0053; B60W 50/14; B60W 2050/146; B60W 2540/10; B60W 2540/18; B60W 2540/30; B60W 60/0051; B60W 60/0059; B60W 2556/10; B60W 2540/229; G08G 1/16; G08G 1/017; G06V 20/597
See application file for complete search history.

(56) References Cited

U.S. PATENT DOCUMENTS

2012/0083964 A1* 4/2012 Montemerlo ........... B60T 8/885
701/25
2016/0362116 A1* 12/2016 Otsuka .............. B60W 60/0051
(Continued)

FOREIGN PATENT DOCUMENTS

WO 2018/115963 A2 6/2018

*Primary Examiner* — Nga X Nguyen
(74) *Attorney, Agent, or Firm* — Precision Patents, P.C.

(57) ABSTRACT

In a vehicle driving switching device, driving rule determination information under automatic driving is acquired which indicates a determination result of comparison between (i) a driving rule and (ii) an automatic driving characteristic being a characteristic of a host vehicle equipped with an automatic driving device when the host vehicle travels by the automatic driving on a travel path generated by the automatic driving device. The driving mode switching between an automatic driving mode and a manual driving mode is permitted based on condition that the driving rule determination information under the automatic driving indicates that the automatic driving characteristic complies with the driving rule.

29 Claims, 27 Drawing Sheets

(52) U.S. Cl.
CPC ..... *B60W 2540/10* (2013.01); *B60W 2540/18*
(2013.01); *B60W 2540/30* (2013.01)

(56) References Cited

U.S. PATENT DOCUMENTS

| | | | | |
|---|---|---|---|---|
| 2017/0322553 A1* | 11/2017 | Wei | ........................ | B60W 30/16 |
| 2017/0334452 A1* | 11/2017 | Abe | ........................ | B60W 10/20 |
| 2018/0173228 A1* | 6/2018 | Wada | .................. | B60W 30/182 |
| 2018/0312161 A1* | 11/2018 | Asakura | ................ | B60W 30/09 |
| 2019/0049948 A1* | 2/2019 | Patel | .................. | G05D 1/0276 |
| 2020/0264608 A1* | 8/2020 | Rosati | .................. | G05D 1/0061 |
| 2021/0078605 A1* | 3/2021 | Namba | ................ | B60W 40/09 |
| 2022/0289250 A1* | 9/2022 | Oba | ........................ | G08G 1/16 |

* cited by examiner

VEHICLE DRIVING SWITCHING DEVICE, VEHICLE DRIVING SYSTEM, AND VEHICLE DRIVING SWITCHING METHOD

CROSS REFERENCE TO RELATED APPLICATIONS

The present application is a continuation application of International Patent Application No. PCT/JP2020/038375 filed on Oct. 9, 2020, which designated the U.S. and claims the benefit of priority from Japanese Patent Application No. 2019-186267 filed on Oct. 9, 2019. The entire disclosures of all of the above applications are incorporated herein by reference.

TECHNICAL FIELD

The present disclosure relates to a vehicle driving switching device, a vehicle driving system, and a vehicle driving switching method, for switching between automatic driving and manual driving.

BACKGROUND

Techniques are known to determine whether to allow switching between manual driving and automatic driving. There is disclosed an automatic driving device that allows switching to automatic driving when the difference between the manual driving operation amount by the driver during manual driving and the automatic driving operation amount calculated by the automatic driving calculation unit is equal to or less than a threshold value.

There is also disclosed a device that estimates an automatic driving characteristic as a characteristic in a navigation operation of a target vehicle, compares the characteristic with a driving rule, and determines execution of the navigation operation that complies with the driving rule.

SUMMARY

According to an example of the present disclosure, a vehicle driving switching device is provided as follows. In the vehicle driving switching device, driving rule determination information under automatic driving is acquired which indicates a determination result of comparison between (i) a driving rule and (ii) an automatic driving characteristic being a characteristic of a host vehicle equipped with an automatic driving device when the host vehicle travels by the automatic driving on a travel path generated by the automatic driving device. The driving mode switching between an automatic driving mode and a manual driving mode is permitted based on condition that the driving rule determination information under the automatic driving indicates that the automatic driving characteristic complies with the driving rule.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

First Embodiment

Figure 1:
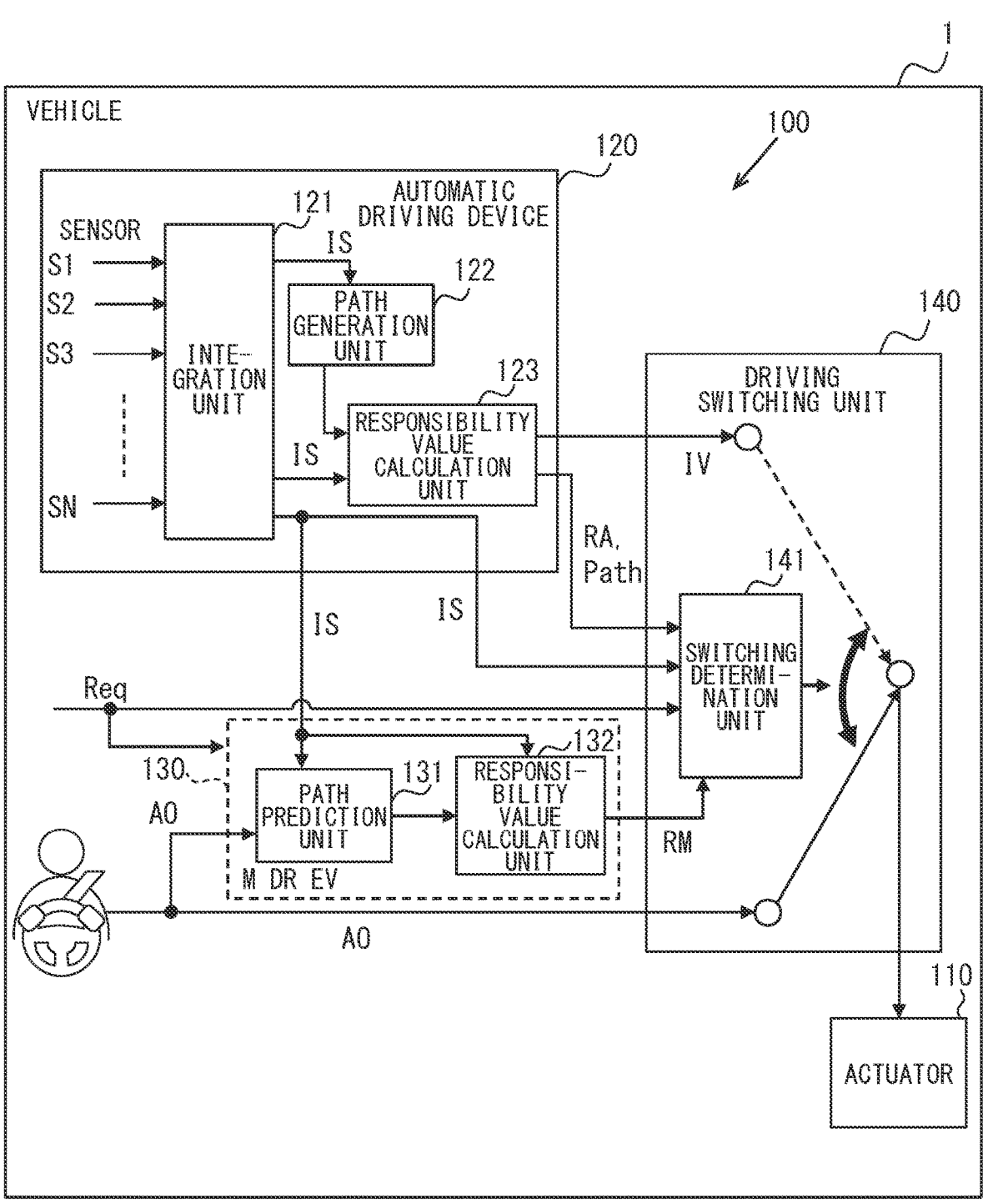
FIG. 1 is a diagram showing a configuration of a vehicle driving system according to a first embodiment.

The following will describe an embodiment of the present disclosure with reference to the drawings. FIG. 1 is a configuration diagram showing a vehicle driving system 100 according to a first embodiment. A vehicle driving system 100 includes an actuator 110, an automatic driving device 120, a manual driving evaluation unit 130, and a driving switching unit 140. This vehicle driving system 100 is mounted on a host vehicle 1. In other words, the host vehicle 1 is a vehicle equipped with the vehicle driving system 100. The vehicle is equipped with (i) a drive source such as an engine and (ii) wheels. The vehicle includes a passenger car, a bus, and a truck.

The actuator 110 includes an actuator for running the host vehicle 1, an actuator for stopping the host vehicle 1, and an actuator for changing the traveling direction of the host vehicle 1.

[Explanation of Automatic Driving Device 120]

The automatic driving device 120 is a device for automatically driving the host vehicle 1. The automatic driving device 120 includes an integration unit 121, a path generation unit 122, and a responsibility value calculation unit 123. The integration unit 121 acquires sensor signals from a plurality of sensors S1, S2, S3 . . . SN (N is an integer) mounted on the host vehicle 1.

The sensor S includes a sensor that detects the behavior of a peripheral vehicle. The sensor S can include a camera. In addition, a millimeter wave radar and LIDAR can be included as the sensor S.

The sensor S also includes a sensor that detects the position of the host vehicle 1 and the behavior of the host vehicle 1. If the current position of the host vehicle 1 (hereinafter referred to as the host vehicle position) can be sequentially detected, the speed and the traveling direction of the host vehicle 1, which are the behavior of the host vehicle 1, can be determined. Therefore, if the host vehicle 1 is equipped with a sensor that detects the position of the vehicle, the sensor S that directly detects the behavior of the host vehicle 1 may not be provided. The sensor S for detecting the position of the host vehicle may also include a GNSS receiver. The sensor S for detecting the behavior of the host vehicle 1 can include a vehicle speed sensor, a yaw rate sensor, an acceleration sensor, and the like.

Further, the current position of the host vehicle can be detected by collating the shape of the surrounding area around the host vehicle 1 detected by LIDAR or the like with the high-precision map. In this case, the position of the host vehicle 1 and the behavior of the host vehicle 1 can be detected by the sensor S that detects the behavior of a peripheral vehicle without providing the dedicated sensor S for detecting the position of the host vehicle 1 and the behavior of the host vehicle 1.

The integration unit 121, the path generation unit 122, and the responsibility value calculation unit 123 can be realized by a configuration including at least one processor. For example, the integration unit 121, the path generation unit 122, and the responsibility value calculation unit 123 can be realized by a computer including at least one processor, ROM, RAM, I/O, and a bus line connecting these constituent elements. The ROM stores a program for making a general-purpose computer function as an integration unit 121, a path generation unit 122, and a responsibility value calculation unit 123. When the processor executes the program stored in the ROM while using the temporary storage function of the RAM, the computer functions as an integration unit 121, a path generation unit 122, and a responsibility value calculation unit 123. Execution of these functions signifies that the vehicle control method corresponding to the program is executed.

Further, the manual driving evaluation unit 130 and the driving switching unit 140 can also be realized by a configuration including at least one processor. A processor that functions as an integration unit 121, a path generation unit 122, and a responsibility value calculation unit 123 may function as a manual driving evaluation unit 130 and a driving switching unit 140. Further, a processor different from the processor that functions as the integration unit 121, the path generation unit 122, and the responsibility value calculation unit 123 may realize the functions of the manual driving evaluation unit 130 and the driving switching unit 140.

The integration unit 121 integrates the acquired plurality of sensor values, and sequentially determines the behavior of the peripheral vehicle, the behavior of the host vehicle 1, and the travel environment information around the host vehicle 1. The travel environment information can include various information that affects the future travel path of the host vehicle 1, such as the position and shape of the road marking line, road marking, road sign, road surface condition, and weather. What kind of information is specifically included as the travel environment information is set in advance. The integration unit 121 sequentially outputs the sensor-based information IS including the determined travel environment information to the path generation unit 122 and the like.

The sensor-based information IS includes (i) the sensor value input to the integration unit 121 and (ii) the information that can be derived based on the sensor value input to the integration unit 121. The information that can be derived based on the sensor value includes the above-mentioned travel environment information. Further, the sensor-based information IS can include target vehicle information. The target vehicle information is information representing the relative behavior of the peripheral vehicle determined based on the sensor value, and the position and behavior of the host vehicle 1.

The path generation unit 122 generates a travel path on which the host vehicle 1 should travel next. The travel path is for determining the operation of the actuator 110. The actuator 110 controls the acceleration/deceleration and the traveling direction of the host vehicle 1. Therefore, the travel path determines the instruction given to the actuator 110 in the next control cycle. The travel path also includes time information, and determines at which position the host vehicle 1 should be located at a certain time. In addition to the travel path, the path generating unit 122 also determines an instruction value IV indicated to the actuator 110 in order to realize the travel path. The indicated value IV can be expressed by the accelerator opening degree, the brake hydraulic pressure, and the steering operation amount. The path generation unit 122 outputs the travel path and the indicated value IV to the responsibility value calculation unit 123.

The travel path generated by the path generating unit 122 is a path capable of heading to a destination while avoiding peripheral vehicles. Therefore, the travel path is a path for continuing traveling, except for the case where the host vehicle 1 is stopped or decelerated in an emergency, which will be described later. The destination can be a destination set by the occupant of the host vehicle 1, if set. Further, the destination may be a point which the host vehicle 1 will reach after traveling a certain distance on the road on which the host vehicle 1 is currently traveling. In some cases, it is possible to generate multiple paths that can be directed to the destination while avoiding peripheral vehicles. Therefore, the path generation unit 122 may generate a plurality of travel paths. The travel path also includes time information, and determines at which position the host vehicle 1 should be located at a certain time. Therefore, for example, even if the travel paths are the same, if the positions reached after Δt seconds are different, the travel paths are different from each other.

The responsibility value calculation unit 123 sequentially calculates the responsibility value RA when the automatic driving device 120 performs the automatic driving. The automatic driving here means a driving in which the driving is continued without the intervention of the driver. The responsibility value RA by automatic driving is a value indicating the degree of potential responsibility based on the comparison between (i) the driving rule and (ii) the characteristic of the host vehicle 1 when the host vehicle 1 travels on the travel path generated by the path generation unit 122 by automatic driving. In the present embodiment, the characteristic of the host vehicle 1 in this case is referred to as an automatic driving characteristic. The automatic driving characteristic can include the behavior of the host vehicle 1 during automatic driving (that is, the automatic driving behavior). The behavior of the host vehicle 1 can be shown by (i) the direction in which the host vehicle 1 is moving, (ii) the speed at which the host vehicle 1 is moving, and (iii) the acceleration. Acceleration also includes minus, that is, deceleration. The direction in which the host vehicle 1 is moving can be indicated by the current traveling direction, or can be indicated by the turning direction. Further, the position of the host vehicle 1 can be included in the automatic driving behavior. The characteristic of the host vehicle 1, such as the automatic driving characteristic, can include (i) the type, size, and model of the host vehicle 1, and (ii) the travel environment information recognized by the analysis of the scene in the environment of the host vehicle 1. The travel environment information includes objects, vehicles, pedestrians, road shapes, road marking lines, traffic lights, traffic signs, and their positions, paths, etc.

When the path generation unit 122 generates a plurality of travel paths, the responsibility value calculation unit 123 selects a single optimum travel path from the plurality of travel paths. The optimum travel path is a travel path having the smallest responsibility value RA. When the path generation unit 122 generates only one travel path, the responsibility value RA is calculated for the one travel path.

The responsibility value RA (the same applies to the responsibility values RM and RMS described later) is a value indicating the degree of potential responsibility based on the comparison between the characteristic of the host vehicle and the driving rule. The responsibility values RA, RM, and RMS are specific examples of determination values that indicate the degree of compliance of the characteristic of the host vehicle 1 with the driving rule. In the embodiment, the responsibility values RA, RM, and RMS can be replaced with determination values. Further, the determination value is an example of the driving rule determination information. The driving rule determination information is information indicating the determination result of comparison between the characteristic of the host vehicle 1 and the driving rule. The driving rule determination information may be information that merely indicates the determination result of whether or not the characteristic complies with or deviates from the driving rule. The driving rule determination information may be information indicating whether or not the characteristic complies with or deviates from the driving rule in a numerical form such as a determination value or a responsibility value RA, RM, RMS. In this way, the responsibility value calculation unit 123 functions as a determination value calculation unit that calculates a determination value and a driving rule determination generation unit that generates driving rule determination information. The driving rule may be stored in a storage medium such as RAM or ROM as referenceable data in the process of generating the driving rule determination information (the process of calculating the responsibility values RA and RM). When the process of generating the driving rule determination information is realized by a trained model including a neural network or the like, the driving rule may be given as teacher data to be used when training the trained model. The driving rule may include at least one of a vertical speed rule, a horizontal speed rule, a driving priority rule, a traffic light based rule, a traffic sign based rule, and a route priority rule. The driving rule may include, in part or in whole, a local traffic rule so as to overlap some or all of the rules exemplified in the foregoing, or as another rule. The driving rule may be an element for implementing a driving policy. The driving policy may be defined as a strategy and a rule that define control behavior at the vehicle level. The driving policy may be defined as an implementation of the decision-making level of Vehicle Level Safety Strategy (VLSS). The driving policy may be defined as a mapping from the detected state to the driving command. Further, the responsibility value RA can be calculated as a value representing the relative degree with respect to a target vehicle. The target vehicle is one vehicle selected from the peripheral vehicles. When a plurality of peripheral vehicles exist around the host vehicle 1, the plurality of peripheral vehicles are sequentially selected as a target vehicle.

In the present embodiment, the responsibility value RA becomes smaller as the responsibility is lower. That is, the responsibility value RA becomes smaller as the possibility that the automatic driving characteristic of the host vehicle 1 deviates from the driving rule is lower. For example, if the inter-vehicle distance is sufficiently secured, the responsibility value RA becomes a small value. Further, the responsibility value RA can be set to a large value when the host vehicle 1 suddenly accelerates or decelerates. The same applies to the responsibility value RM described later.

Further, the responsibility value calculation unit 123 can set the responsibility value RA to a low value when the host vehicle 1 is traveling according to the traffic rule. In order to determine whether or not the host vehicle 1 is traveling according to the traffic rule, the responsibility value calculation unit 123 can be provided with a configuration for acquiring the traffic rule at the point where the host vehicle 1 is traveling.

As a configuration for acquiring the traffic rule at the point where the host vehicle 1 is traveling, it is possible to adopt a configuration in which the position of the host vehicle 1 is detected and the traffic rule at that position is acquired from the rule database. Alternatively, the traffic rule at the current position may be acquired by analyzing an image captured by a camera that captures the periphery of the host vehicle 1 and detecting a sign, a traffic light, a road marking, or the like.

After determining the optimum travel path, the responsibility value calculation unit 123 outputs an instruction value IV instructed to the actuator 110 to the driving switching unit 140 so as to travel on the optimum travel path. Further, the responsibility value RA for the optimum travel path is output to the switching determination unit 141.

[Explanation of Manual Driving Evaluation Unit 130]

The manual driving evaluation unit 130 includes a path prediction unit 131 and a responsibility value calculation unit 132. The path prediction unit 131 acquires the driver's operation amount AO. The operation amount AO is an accelerator operation amount, a brake operation amount, and a steering operation amount. It also acquires sensor-based information IS. The path prediction unit 131 predicts the travel path of the host vehicle 1 when the driver drives the host vehicle 1, that is, the travel path by manual driving from the operation amount AO and the sensor-based information IS by using a preset driver model. The driver model is a model that predicts the travel path from the operation amount AO and the sensor-based information IS. The driver model can be sequentially learned and updated.

The responsibility value calculation unit 132 sequentially calculates the responsibility value RM when the driver manually drives the host vehicle 1. The responsibility value RM by manual driving can be calculated in the same manner as the responsibility value calculation unit 123. The responsibility value calculation unit 123 receives the sensor-based information IS and the travel path generated by the travel path generation unit 122 during automatic driving, and calculates the responsibility value RA by automatic driving. The only difference is that the responsibility value calculation unit 132 uses the travel path by manual driving instead of the travel path by automatic driving. In the present embodiment, the characteristic of the host vehicle 1 in this case is referred to as a manual driving characteristic. The responsibility value calculation unit 132 inputs the calculated responsibility value RM to the switching determination unit 141.

Figure 2:
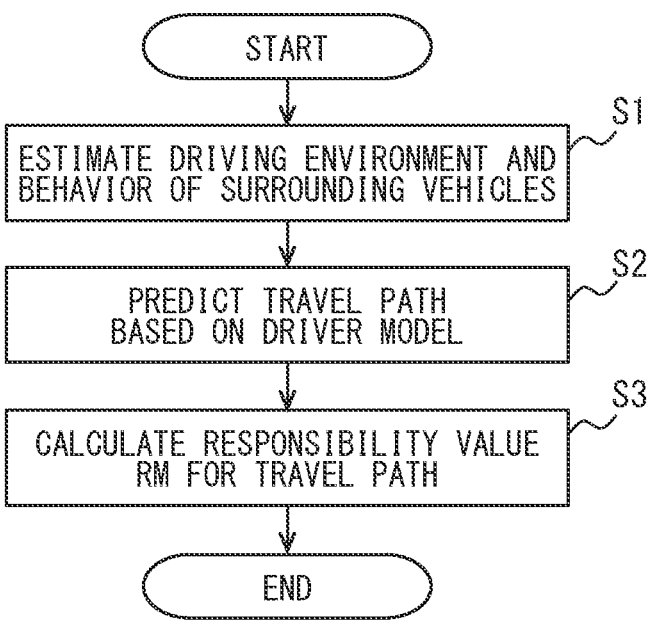
FIG. 2 is a diagram showing a process executed by a manual driving evaluation unit.

FIG. 2 shows a flowchart of the process executed by the manual driving evaluation unit 130. In FIG. 2, steps (hereinafter, steps are omitted) S1 and S2 are executed by the path prediction unit 131, and S3 is executed by the responsibility value calculation unit 132. The process shown in FIG. 2 starts when the mode switching request Req is received while the driving mode is the manual driving mode.

In S1, the travel environment and the behavior of peripheral vehicles are estimated from the sensor-based information IS. In S2, the travel path is predicted by using the travel environment estimated in S1, the driver's operation amount AO, and the driver model.

In S3, the responsibility value RM when the travel path is manually driven is calculated based on the travel path predicted in S2, the travel environment and the behavior of peripheral vehicles estimated in S1, and the driver model.

[Explanation of Driving Switching Unit 140]

Return to the description of FIG. 1. The driving switching unit 140 switches whether the authority to drive and operate the host vehicle 1 is the automatic driving device 120 or the driver. When the authority to drive and operate the host vehicle 1 is the automatic driving device 120, the instruction value IV output from the automatic driving device 120 is transmitted to the actuator 110. When the driver has the authority to drive and operate the host vehicle 1, the operation amount AO is transmitted to the actuator 110.

Further, the driving switching unit 140 includes a switching determination unit 141. In this embodiment, the driving switching unit 140 includes a switching determination unit 141. However, the switching determination unit 141 may be provided outside the driving switching unit 140. A vehicle driving switching device may be defined as including the driving switching unit 140 and the switching determination unit 141. The vehicle driving switching device executes the vehicle driving switching method shown in FIG. 3.

The switching determination unit 141 acquires the responsibility value RA, the responsibility value RM, the sensor-based information IS, and the mode switching request Req. There are two types of mode switching request Req: (i) a manual driving mode switching request for changing the driving mode from the automatic driving mode to the manual driving mode, and (ii) an automatic driving mode switching request for changing the driving mode from the manual driving mode to the automatic driving mode. The manual driving mode switching request and the automatic driving mode switching request are generated by, for example, a switch operation of the driver, and are input to the switching determination unit 141.

Figure 3:
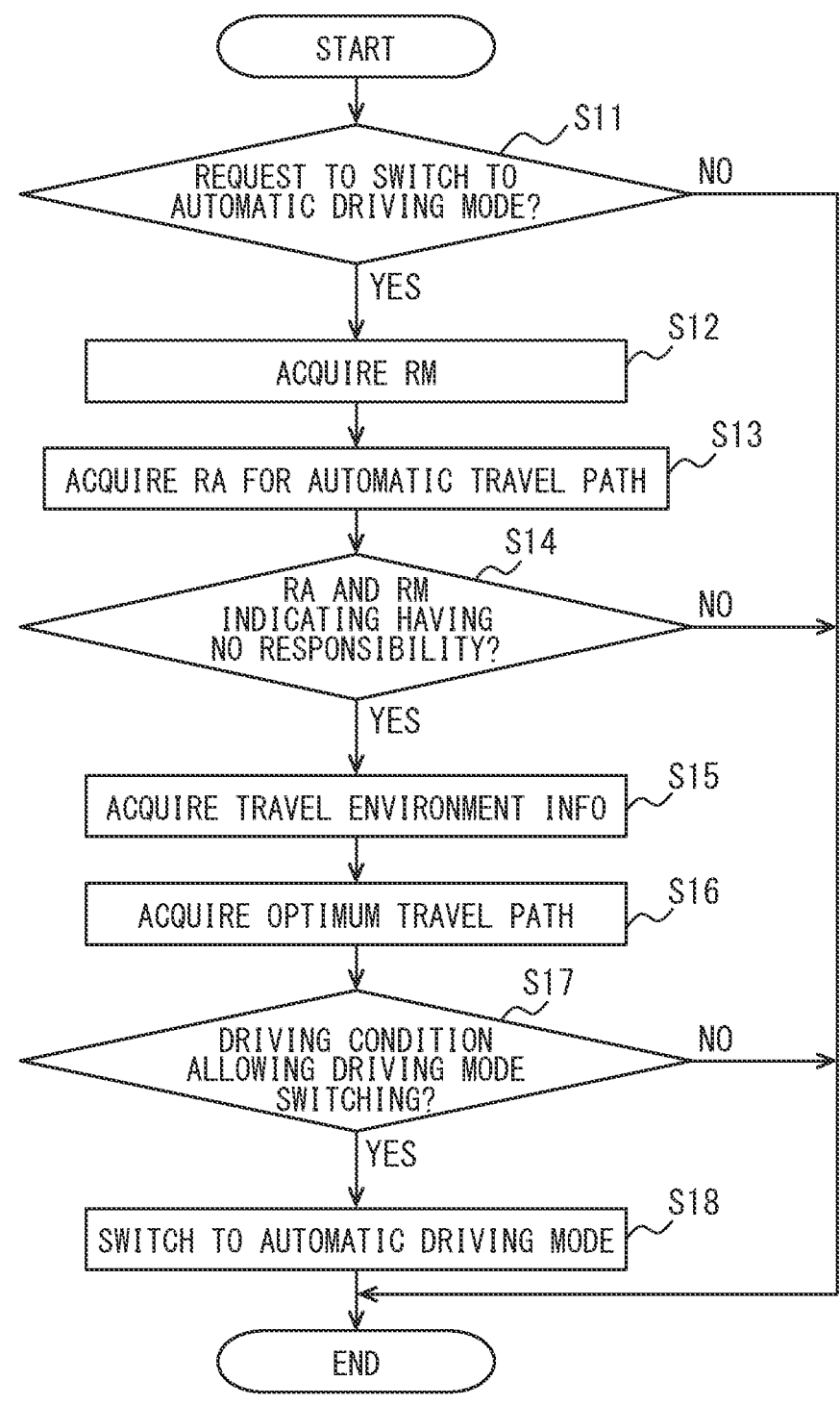
FIG. 3 is a diagram showing a process executed by a switching determination unit.

FIG. 3 shows a flowchart of the process executed by the switching determination unit 141. The switching determination unit 141 periodically executes the process shown in FIG. 3. The process shown in FIG. 3 is a process for switching from the manual driving mode to the automatic driving mode. The process for switching from the automatic driving mode to the manual driving mode will be described in a third and subsequent embodiments.

In S11, it is determined whether or not there is a request to switch to the automatic driving mode. If the determination result in S11 is NO, the process shown in FIG. 3 is terminated. When the determination result of S11 is YES, the process proceeds to S12.

S12 and S13 are processes as a responsibility value acquisition unit. The responsibility value acquisition unit also functions as (i) a determination value acquisition unit for acquiring a determination value and (ii) a driving rule determination acquisition unit for acquiring driving rule determination information. Further, S12 also corresponds to a manual driving rule determination acquisition unit, and S13 also corresponds to an automatic driving rule determination acquisition unit. In S12, the responsibility value RM is acquired from the responsibility value calculation unit 132. The responsibility value RM is calculated by the process shown in FIG. 2. In S13, the responsibility value RA for the automatic travel path is acquired. The automatic travel path is a travel path generated by the travel path generation unit 122 of the automatic driving device 120. The responsibility value RA is sequentially calculated by the responsibility value calculation unit 123. In the travel path generation unit 122, the responsibility value RA may be calculated for a plurality of peripheral vehicles even if the travel path is one. In the following, the responsibility value RA for one travel path shall indicate the largest one of the responsibility values RA calculated for a plurality of peripheral vehicles for the travel path, unless otherwise specified.

In addition, a plurality of travel paths may be generated. Therefore, the responsibility value calculation unit 123 may calculate a plurality of responsibility values RAs. In this S13, when the responsibility value RA is calculated for a plurality of travel paths, the smallest responsibility value RA is acquired.

The smallest responsibility value RA is preferably 0. Then, during the automatic driving, the vehicle travels so that the responsibility value RA is maintained at 0. However, depending on the situation of peripheral vehicles, the responsibility value RA may not be 0 temporarily.

When a situation occurs in which the responsibility value RA does not become 0, it is determined whether or not there is a travel path that can make the responsibility value RA 0 (zero) in a short time while preventing sudden deceleration. The sudden deceleration is generally a deceleration to the extent that the occupant feels a sudden deceleration, and a deceleration having an absolute value larger than a preset threshold value is defined as a sudden deceleration.

If there is a travel path that can set the responsibility value RA to 0 (zero) in a short period of time while preventing sudden deceleration, it is allowed that the responsibility value RA temporarily becomes a value larger than 0. If there is no travel path that can set the responsibility value RA to 0 within a short period of time, the travel path generation unit 122 is instructed to generate a travel path that causes the host vehicle 1 to make an emergency stop or urgent deceleration. An example of an emergency stop is a stop in which the host vehicle 1 is decelerated while maintaining the maximum possible deceleration until the host vehicle 1 stops. However, the emergency stop does not necessarily have to maintain the maximum possible deceleration as long as the deceleration is started immediately in order to stop the host vehicle 1. Further, the emergency deceleration differs from the emergency stop in that the speed at the end of the emergency deceleration is larger than 0, but the deceleration until the speed at which the emergency deceleration ends may be the same as the emergency stop. The responsibility value RA is sequentially calculated even in the deceleration process; the emergency deceleration may be terminated when the responsibility value RA becomes 0.

In S14, it is determined whether or not the responsibility values RA and RM acquired in S12 and S13 are both values that indicate having no responsibility. In this determination, the automatic side allowable threshold value and the manual side allowable threshold value set for the responsibility values RA and RM are compared with the responsibility values RA and RM acquired in S12 and S13, respectively. When it is determined that the responsibility values RA and RM acquired in S12 and S13 are both values that indicate having no responsibility, the automatic side allowable threshold value and the manual side allowable threshold value are both 0.

It is not always necessary to determine whether the responsibility values RA and RM indicate having no responsibility. That is, it is not always necessary to set the automatic side allowable threshold value and the manual side allowable threshold value to 0. It is most preferable to set the automatic side allowable threshold value and the manual side allowable threshold value to 0 in order to suppress sudden behavior. However, when the automatic side allowable threshold value and the manual side allowable threshold value are set to 0, it is often determined that the driving mode cannot be switched, and the convenience is reduced. Therefore, in consideration of convenience, the automatic side allowable threshold value and the manual side allowable threshold value may be set to values larger than 0.

If the determination result in S14 is NO, the process of FIG. 3 is terminated. If the determination result in S14 is YES, the process proceeds to S15. In S15, the sensor-based information IS is acquired, and the travel environment information included in the sensor-based information IS is acquired.

In S16, the optimum travel path is acquired from responsibility value calculation unit 123. In S17, it is determined whether or not the travel condition allows driving mode switching based on the travel environment information acquired in S15. When the road currently being driven is a preset driving section where driving operation is difficult, it is determined that the driving mode cannot be switched. For example, a sharp curve section can be a driving section where driving operation is difficult. Further, when the traveling behavior of the host vehicle 1 is in a sudden behavior state, it is determined that the travel condition does not allow driving mode switching. The sudden behavior state includes sudden acceleration above a certain acceleration and deceleration above a certain deceleration. A sharp turn is also included in the sudden behavior state. If the determination result in S17 is NO, the process shown in FIG. 3 is terminated. If the determination result of S17 is YES, the process proceeds to S18. In S18, the mode is switched to the automatic driving mode.

10

Brief of First Embodiment

In the first embodiment described above, when there is a request to switch to the automatic driving mode, the responsibility value RA is acquired (S13). When the responsibility value RA indicates having no responsibility (S14: YES), the driving mode is switched to the automatic driving mode (S18). Therefore, when the driving mode is switched to the automatic driving mode, the condition indicating that the automatic driving characteristic complies with the driving rule is satisfied. Therefore, the driving mode can be switched smoothly.

Further, in the first embodiment, when there is a request to switch to the automatic driving mode, the responsibility value RM by manual driving is also acquired (S12). On the condition that the responsibility value RM indicates having no responsibility (S14: YES), the driving mode is switched to the automatic driving mode (S18). Even if the responsibility value RM indicates having responsibility, it may be possible to switch to the automatic driving mode. In such a case, there is a possibility to switch to the automatic driving mode in a situation where the driving rule is likely to be deviated during manual driving. However, in the first embodiment, the fact that the responsibility value RM indicates having no responsibility is also a condition for switching to the automatic driving mode. Therefore, it is suppressed that the driving mode is switched to the automatic driving mode in a situation where the driving rule is likely to be deviated during the manual driving. Therefore, the lack of smoothness before and after switching is further suppressed.

Further, in the first embodiment, when there is a request for switching to the automatic driving mode, the driving mode is switched to the automatic driving mode (S18) on condition that the driving condition allows the driving mode switching (S17: YES). Therefore, it is possible to prevent the driving mode from being switched to the automatic driving mode in a situation where it is difficult to switch the driving mode. As a result, the possibility of sudden behavior after switching to the automatic driving mode is reduced.

Second Embodiment

Next, a second embodiment will be described. In the following description of the second embodiment, elements having the same reference numerals as those used so far are the same as the elements having the same reference numerals in the previous embodiment, except when specifically mentioned. When only a part of the configuration is described, the embodiment described above can be applied to other parts of the configuration.

Figure 4:
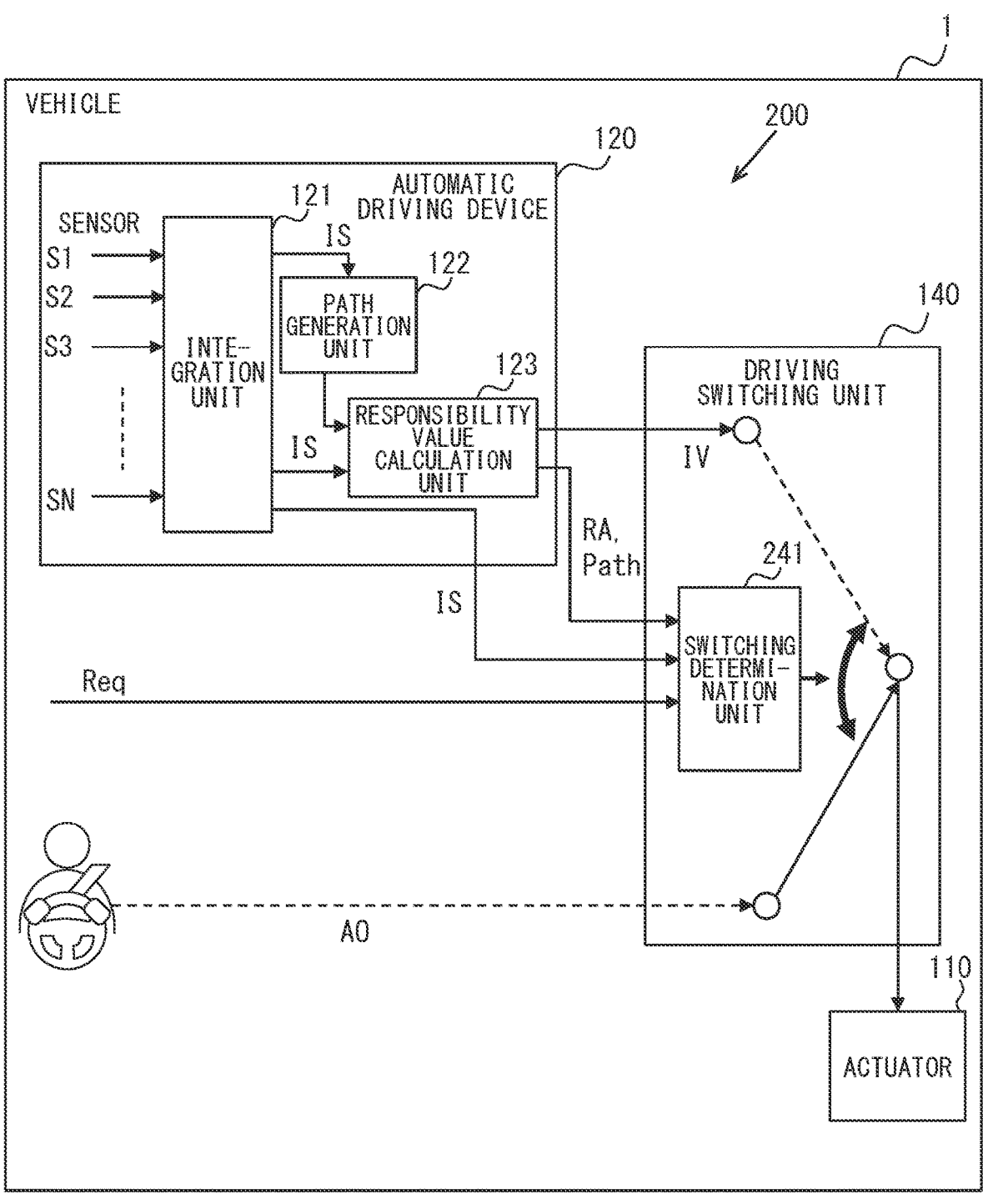
FIG. 4 is a diagram showing a configuration of a vehicle driving system according to a second embodiment.

FIG. 4 shows a configuration diagram of a vehicle driving system 200 according to the second embodiment. The vehicle driving system 200 of the second embodiment is different from the vehicle driving system 100 of the first embodiment in that the manual driving evaluation unit 130 is not provided. Further, since the manual driving evaluation unit 130 is not provided, the processing of the switching determination unit 241 is different from that of the switching determination unit 141 of the first embodiment.

Figure 5:
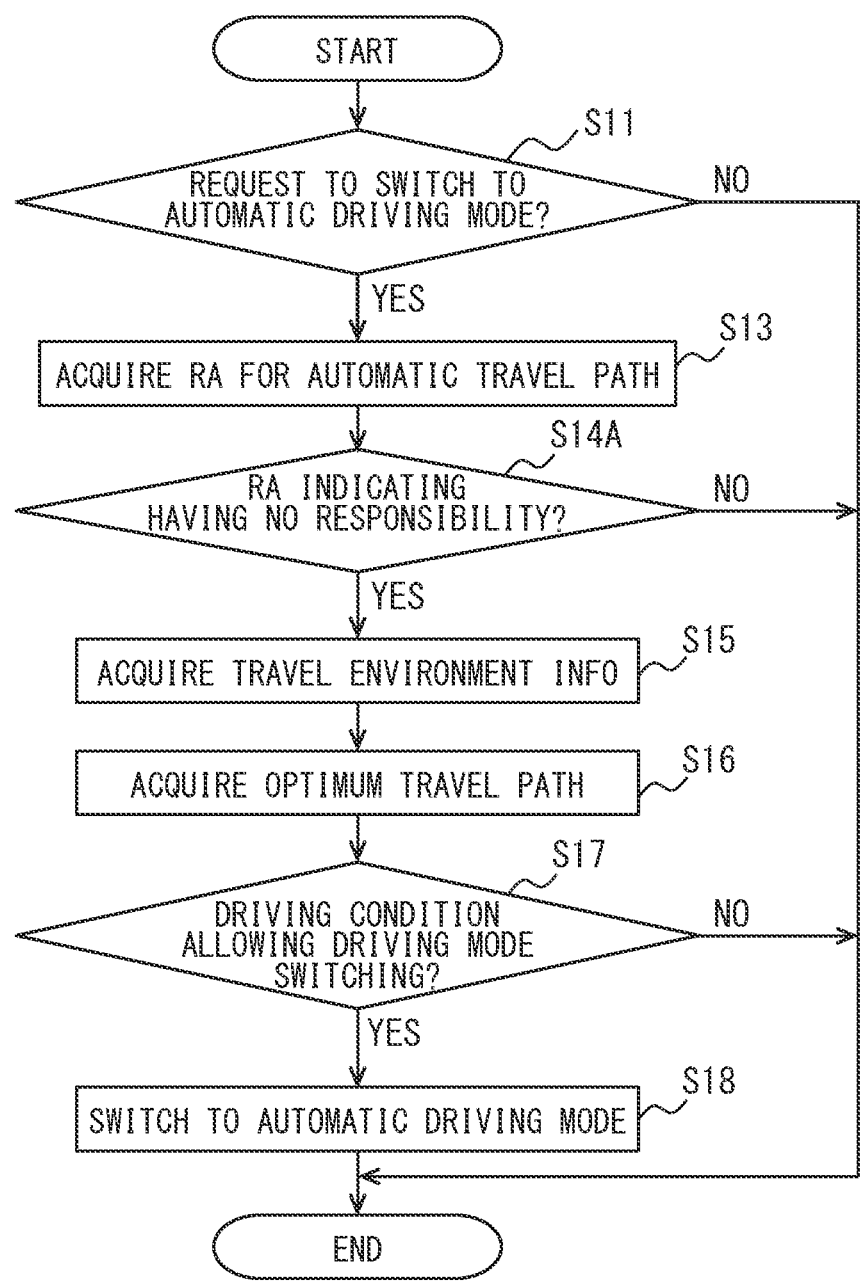
FIG. 5 is a diagram showing a process executed by a switching determination unit in FIG. 4.

FIG. 5 shows a process executed by the switching determination unit 241. The process shown in FIG. 5 differs from the process shown in FIG. 3 in that it does not include S12, which is a process for acquiring the responsibility value RM. Further, S14A is executed instead of S14. In S14A, it is determined whether or not the responsibility value RA acquired in S13 is a value indicating having no responsibility. When the determination result of S14A is NO, the process shown in FIG. 5 is terminated. When the determination result is YES, S15 and subsequent steps are executed. Here, the responsibility value RA becomes smaller as the responsibility is lower. That is, the responsibility value RA becomes smaller as the possibility that the automatic driving characteristic of the host vehicle 1 deviates from the driving rule is lower.

As shown in the second embodiment, in the determination of switching from the manual driving mode to the automatic driving mode, the determination regarding the responsibility value RM can be omitted. Even if the determination regarding the responsibility value RM is omitted, if it is determined that the responsibility value RA indicates having no responsibility, the lack of smoothness in the behavior before and after switching is suppressed although not as much as in the first embodiment.

Third Embodiment

Figure 6:
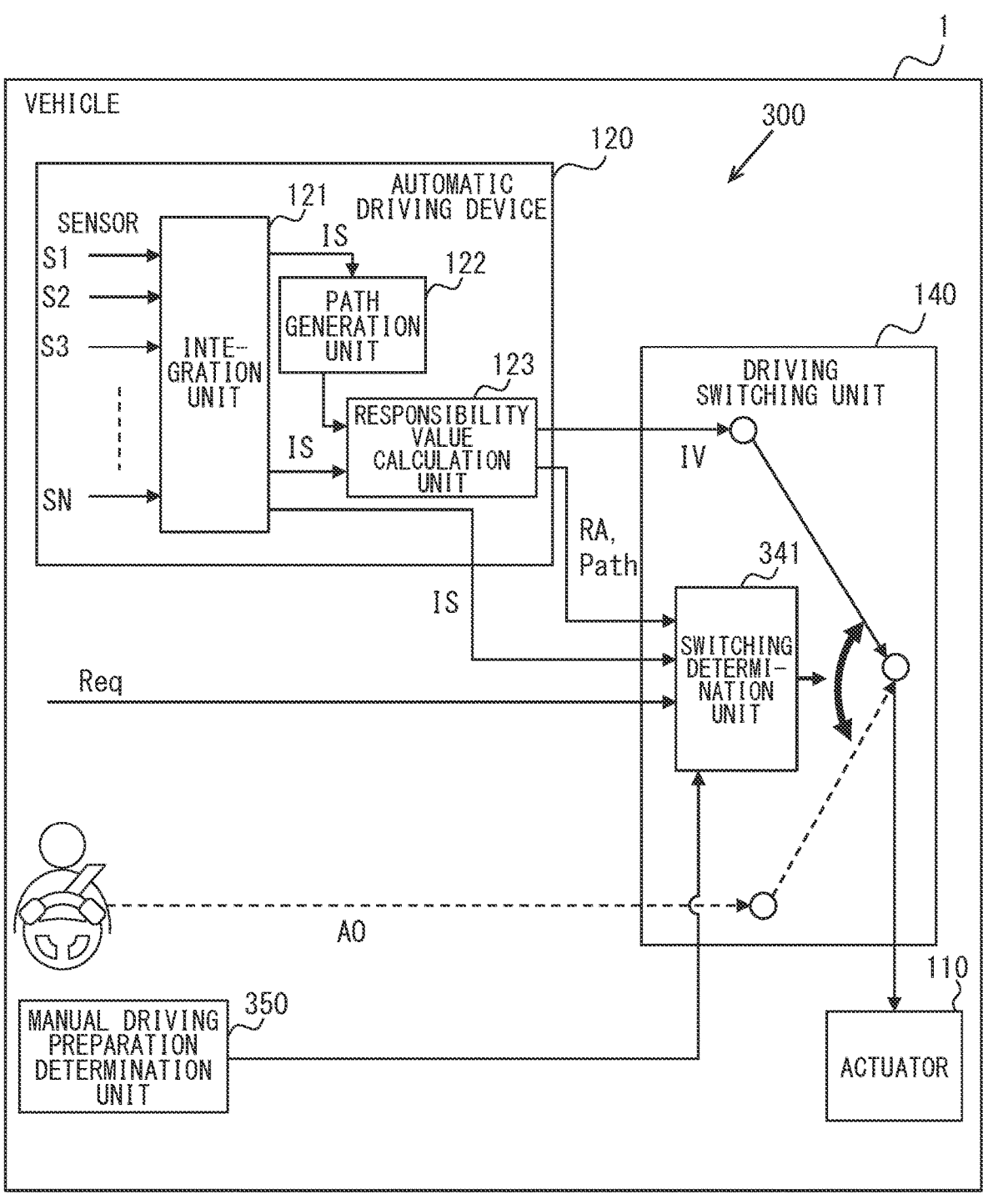
FIG. 6 is a diagram showing a configuration of a vehicle driving system according to a third embodiment.

FIG. 6 shows a configuration diagram of a vehicle driving system 300 of a third embodiment. In the vehicle driving system 300 of the third embodiment, a manual driving preparation determination unit 350 is added to the vehicle driving system 200 of the second embodiment. Further, the process executed by the switching determination unit 341 is different from that of the switching determination unit 241 of the second embodiment.

The manual driving preparation determination unit 350 determines whether the driver is ready to start the driving operation. The preparation for the driver to start the driving operation can be specified as two preparations of (i) the sitting posture of the driver being a front facing posture and (ii) the driver holding the steering wheel. When determining whether these two preparations are complete, the manual driving preparation determination unit 350 acquires an image from the camera that captures the driver's seat and analyzes the image to determine the posture of the driver. From the image, it can be determined whether the driver is holding the steering wheel. Further, a touch sensor may be provided on the steering wheel, and it may be determined whether the driver is holding the steering wheel based on the detection value of the touch sensor.

Figure 7:
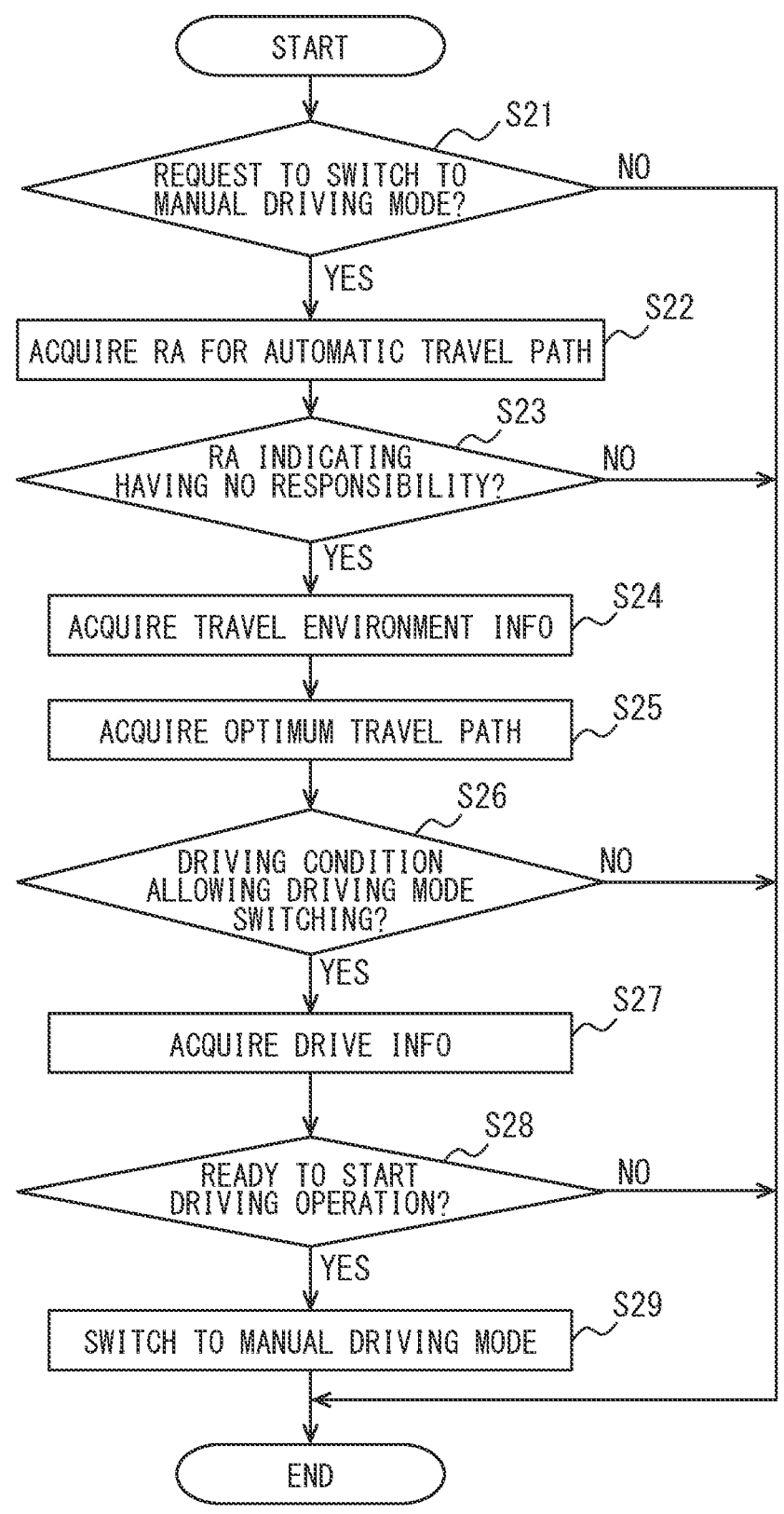
FIG. 7 is a diagram showing a process executed by a switching determination unit in FIG. 6.

FIG. 7 shows a process executed by the switching determination unit 341. However, S27 and S28 are executed by the manual driving preparation determination unit 350. The process shown in FIG. 7 is periodically executed in the same manner as the process shown in FIG. 3. In S21, it is determined whether or not there is a request to switch to the manual driving mode. When the determination result in S21 is NO, the process shown in FIG. 7 is terminated. When the determination result of S21 is YES, the process proceeds to S22.

S22, S23, S24, S25, and S26 are the same as S13, 14A, A15, S16, and S17 in FIG. 5, respectively. When the determination result of S26 is YES, the process proceeds to S27. In S27, the driver information is acquired. The driver information is information for determining whether the driver is ready to start a driving operation. For example, the driver information is an image of the driver and a signal output by a touch sensor provided on the steering wheel.

In S28, it is determined whether the driver is ready to start the driving operation based on the driver information acquired in S27. When the determination result in S28 is NO, the process shown in FIG. 7 is terminated. On the other hand, when the determination result of S28 is YES, the process proceeds to S29. In S29, the driving mode is switched to the manual driving mode.

In this third embodiment, as a condition for switching to the manual driving mode, in addition to the condition shown in the second embodiment, it is also determined that the driver is ready to start the driving operation (S28). Therefore, stable traveling can be continued even after switching to the manual driving mode.

Fourth Embodiment

Figure 8:
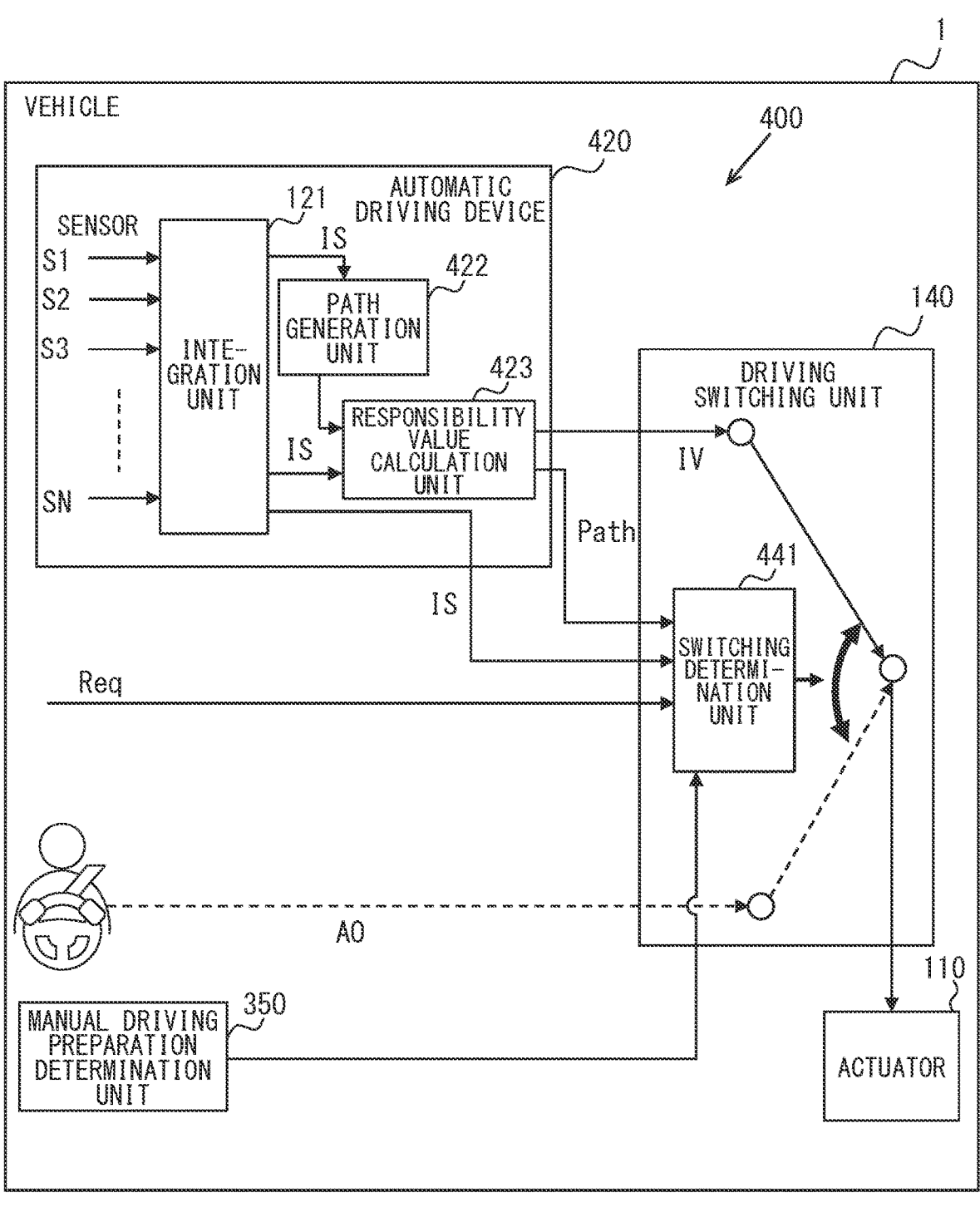
FIG. 8 is a diagram showing a configuration of a vehicle driving system according to a fourth embodiment.

FIG. 8 shows a configuration of a vehicle driving system 400 of a fourth embodiment. In the vehicle driving system 400 of the fourth embodiment, the control of the automatic driving device 420 is different from that of the foregoing embodiments. Further, due to the difference in control of the automatic driving device 420, the processing of the switching determination unit 441 is also different from that of the switching determination unit 341 of the third embodiment.

In the third embodiment, in order to prevent the host vehicle 1 from suddenly decelerating, a state in which the responsibility value RA is not 0 is allowed for a short time. Therefore, the responsibility value calculation unit 323 sets the travel path having the smallest responsibility value RA as the optimum travel path even if the responsibility value RA is not 0. Accordingly, the switching determination unit 341 may output a travel path having a responsibility value RA larger than 0.

On the other hand, in the fourth embodiment, priority is given not to prevent the host vehicle 1 from suddenly decelerating, but to prevent the responsibility value RA from becoming larger than 0. When there is no travel path at which the responsibility value RA becomes 0, the responsibility value calculation unit 423 instructs the path generation unit 422 to generate a travel path that makes the host vehicle 1 urgently stop or decelerate. In this respect, the path generation unit 422 and the responsibility value calculation unit 423 are different from the path generation unit 122 and the responsibility value calculation unit 123.

In the fourth embodiment, the minimum responsibility value RA calculated by the responsibility value calculation unit 423 is always 0 in a state where traveling can be continued. Since the minimum responsibility value RA is always 0 and is not a variable, the responsibility value calculation unit 423 does not output the responsibility value RA to the switching determination unit 441.

Figure 9:
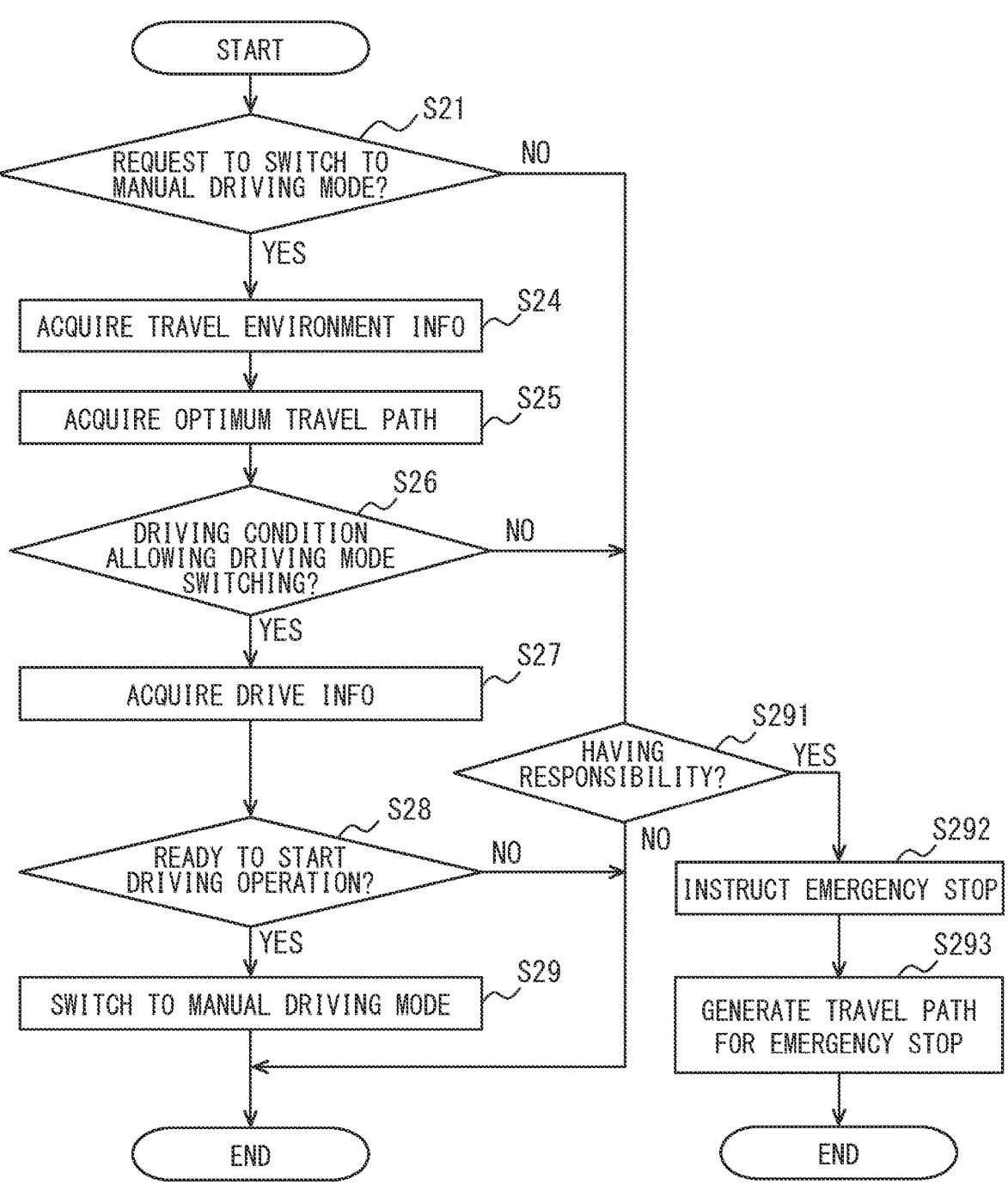
FIG. 9 is a diagram showing a process executed by a switching determination unit in FIG. 8.

FIG. 9 shows the processing executed by the switching determination unit 441, the path generation unit 422, and the responsibility value calculation unit 423 of the fourth embodiment. FIG. 9 differs from FIG. 7 in that S22 and S23 are eliminated from FIG. 7. Further, in FIG. 9, S291, S292, and S293, which are not shown in FIG. 7, have been added. As described above, in the fourth embodiment, the minimum responsibility value RA is always 0 in a state where traveling can be continued. Therefore, there is no need for processing related to determining whether RA is 0. Therefore, S22 and S23 are eliminated.

When the determination result of S21 is NO, or when the determination result of S26 is NO, the process proceeds to S291. The responsibility value calculation unit 423 executes S291 and S292. In S291, it is determined whether or not the responsibility value RA is a value that indicates having the responsibility. Specifically, in the present embodiment, it is determined whether or not the responsibility value RA is larger than 0. When the responsibility value RA is greater than 0, it means that the responsibility value RA is a value that indicates having the responsibility. When the responsibility value RA is a value that indicates having the responsibility, the determination result of S291 becomes YES and the process proceeds to S292. When the responsibility value RA is a value that indicates having no responsibility, the determination result of S291 becomes NO, and the process of FIG. 9 ends. Here, the responsibility value RA becomes smaller as the responsibility is lower. That is, the responsibility value RA becomes smaller as the possibility that the automatic driving characteristic of the host vehicle 1 deviates from the driving rule is lower. Thus it can be said that having the responsibility is likely to deviate from the driving rule.

In S292, the path generation unit 422 is instructed to cause the host vehicle 1 to make an emergency stop. S293, which is a process of the path generation unit 422, generates a travel path for the host vehicle 1 to make an emergency stop. In S292, an emergency deceleration may be instructed instead of an emergency stop. Further, in S293, a travel path that causes the host vehicle 1 to make an emergency stop is initially generated. However, since the responsibility value RA becomes 0 during the deceleration for the emergency stop, the deceleration for the emergency stop may be stopped halfway. In this case, as a result, a travel path for urgently decelerating the host vehicle 1 is generated.

Brief of Fourth Embodiment

In the fourth embodiment, in the automatic driving mode, when the responsibility value RA does not become 0, the travel path is generated for causing the host vehicle 1 to make an emergency stop or an emergency deceleration even if the host vehicle 1 is not stopped. Therefore, in the automatic driving mode, the responsibility value RA is always 0 during normal driving, instead of during emergency stop or emergency deceleration.

Therefore, when there is a request to switch to the manual driving mode, it is possible to switch to the manual driving mode while preventing an occurrence of the responsibility, without need of determining the responsibility value RA.

In addition, in the fourth embodiment, when there is a request to switch to the manual driving mode, the condition for switching to the manual driving mode is satisfied when (i) the driving condition is such that the driving can be switched (S26) and (ii) the driver has completed the driving preparation (S28). Therefore, it is possible to reduce the possibility that the driver deviates from the driving rule after switching to the manual driving mode.

Fifth Embodiment

Figure 10:
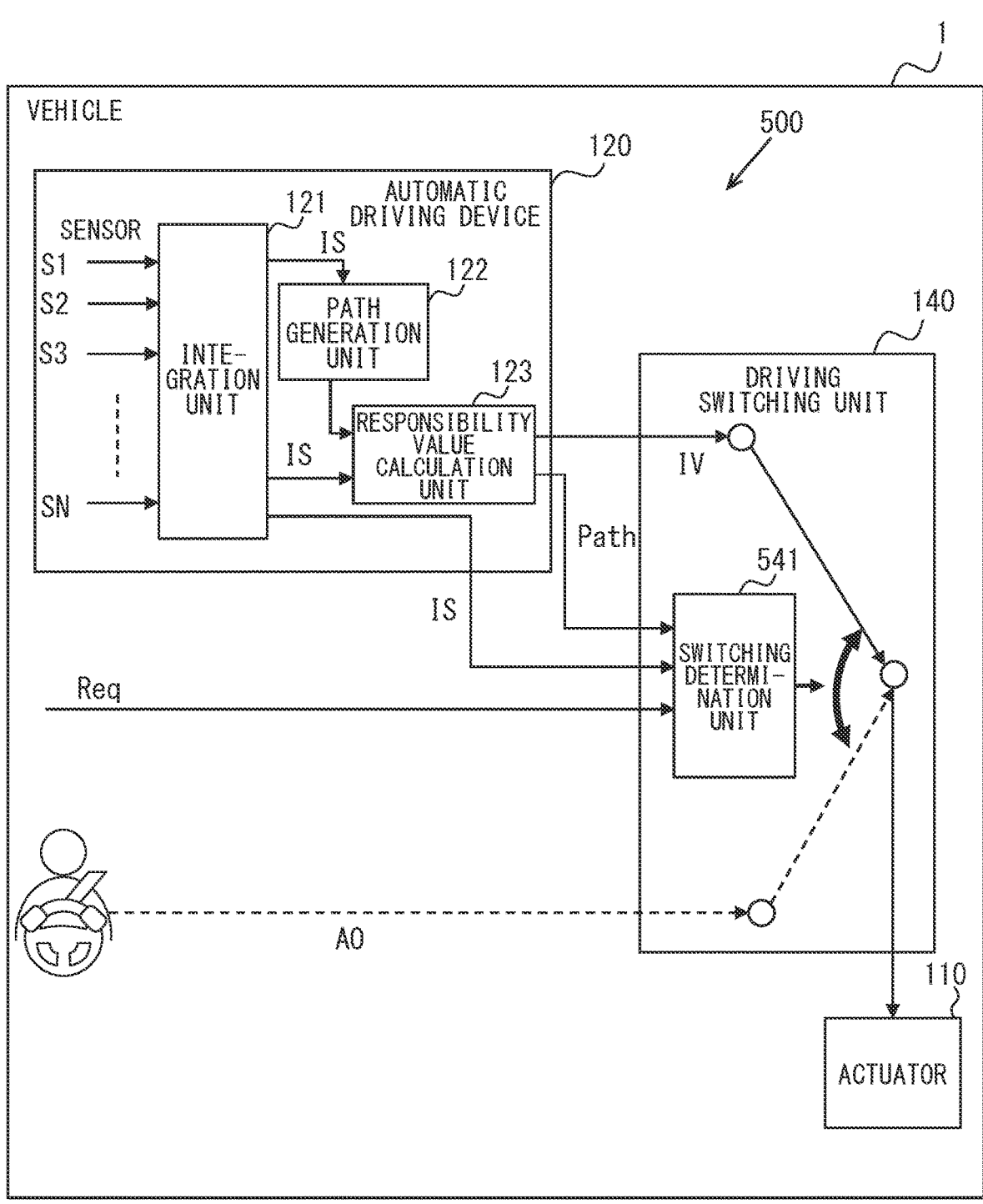
FIG. 10 is a diagram showing a configuration of a vehicle driving system according to a fifth embodiment.

FIG. 10 shows a configuration of a vehicle driving system 500 of a fifth embodiment. The vehicle driving system 500 of the fifth embodiment is different from the vehicle driving system 400 of the fourth embodiment in that it does not include the manual driving preparation determination unit 350. Further, the same automatic driving device 120 as the vehicle driving system 100 of the first embodiment is provided. Due to these, the processing of the switching determination unit 541 is different from the switching determination unit 441 of the fourth embodiment.

Figure 11:
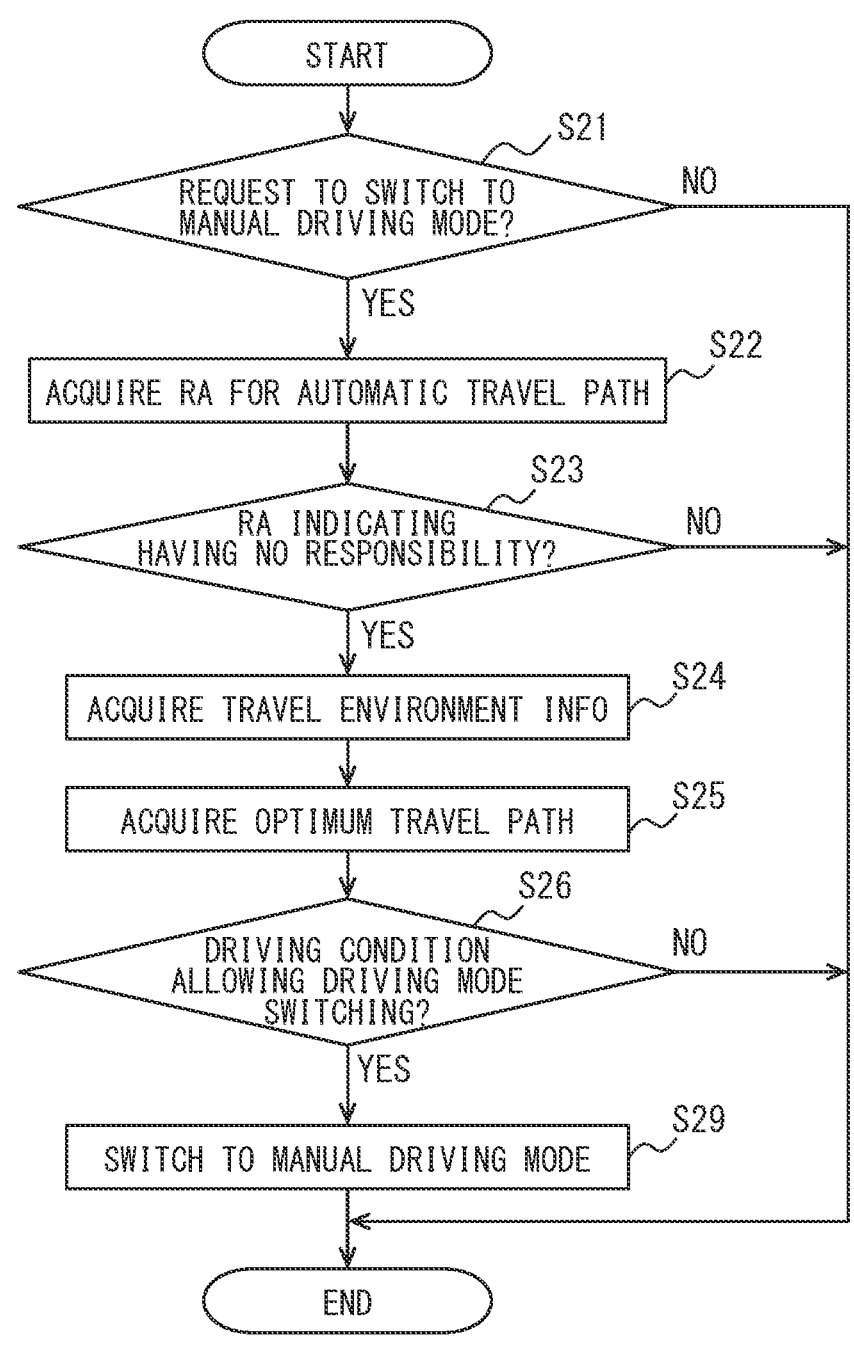
FIG. 11 is a diagram showing a process executed by a switching determination unit according to the fifth embodiment.

FIG. 11 shows a process executed by the switching determination unit 541 of the fifth embodiment. FIG. 11 differs from FIG. 9 in that S22 and S23 are added to FIG. 9, while S27 and S28 are eliminated. The vehicle driving system 500 of the fifth embodiment includes an automatic driving device 120 that allows the responsibility value RA to temporarily become larger than 0. Therefore, in S22 and S23, it is determined whether or not the responsibility value RA is a value that indicates having no responsibility. Further, the vehicle driving system 500 does not include a manual driving preparation determination unit 350. Therefore, the switching determination unit 541 does not require that the driver is ready to start the driving operation as a condition for switching to the manual driving mode. Here, the responsibility value RA becomes smaller as the responsibility is lower. That is, the responsibility value RA becomes a smaller value as the possibility that the automatic driving characteristic of the host vehicle 1 deviates from the driving rule becomes smaller; having no responsibility means that the possibility of deviating from the driving rule is low.

Sixth Embodiment

Figure 12:
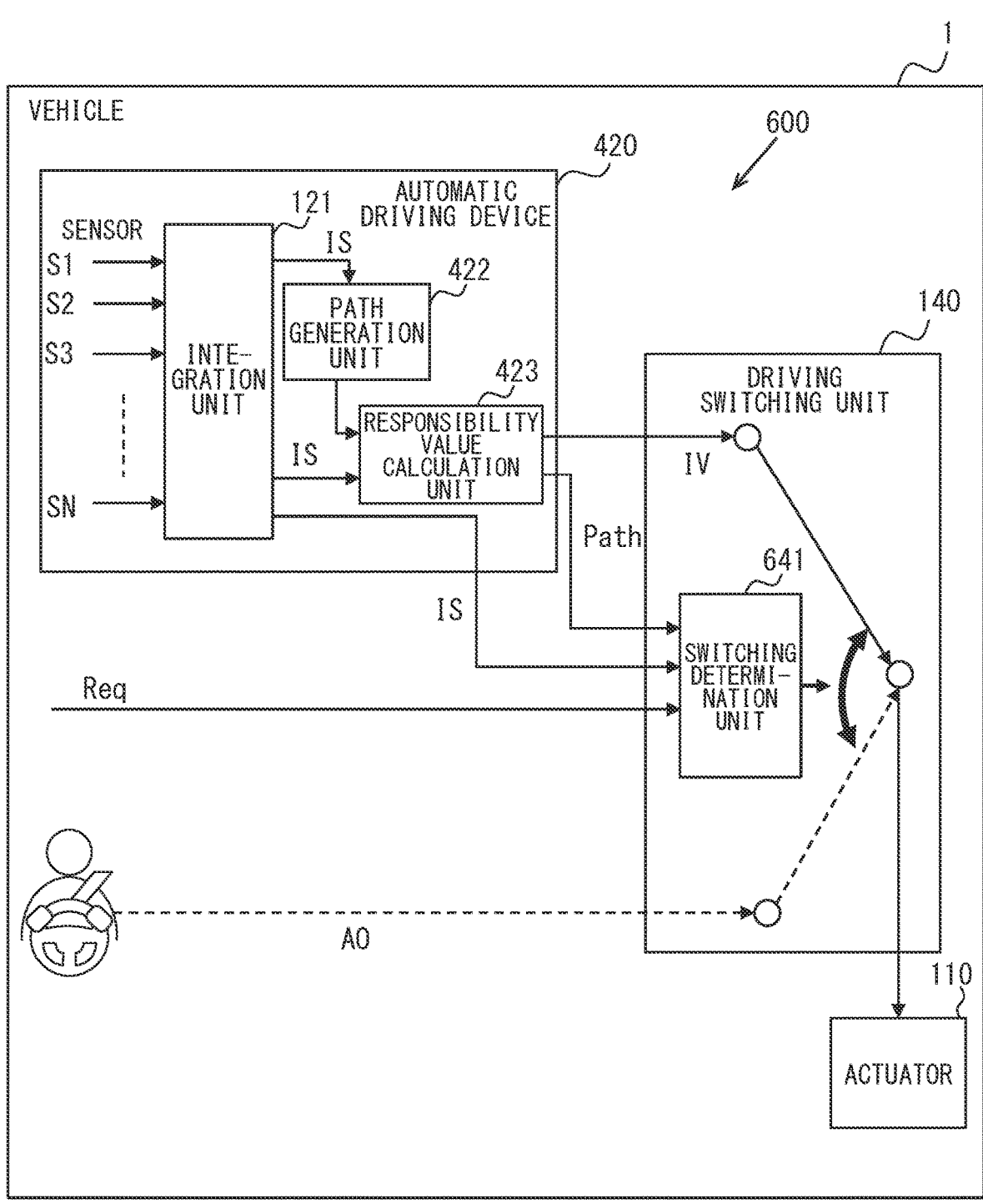
FIG. 12 is a diagram showing a configuration of a vehicle driving system according to a sixth embodiment.

FIG. 12 shows a configuration of a vehicle driving system 600 of a sixth embodiment. The vehicle driving system 600 includes the same automatic driving device 420 as the vehicle driving system 400 of the fourth embodiment. In the automatic driving device 420, the responsibility value RA for the travel path is maintained at 0 during normal traveling. Like the vehicle driving system 500, the vehicle driving system 600 does not include a manual driving preparation determination unit 350. Due to these, the processing of the switching determination unit 641 is different from the switching determination unit 541 of the fifth embodiment.

Figure 13:
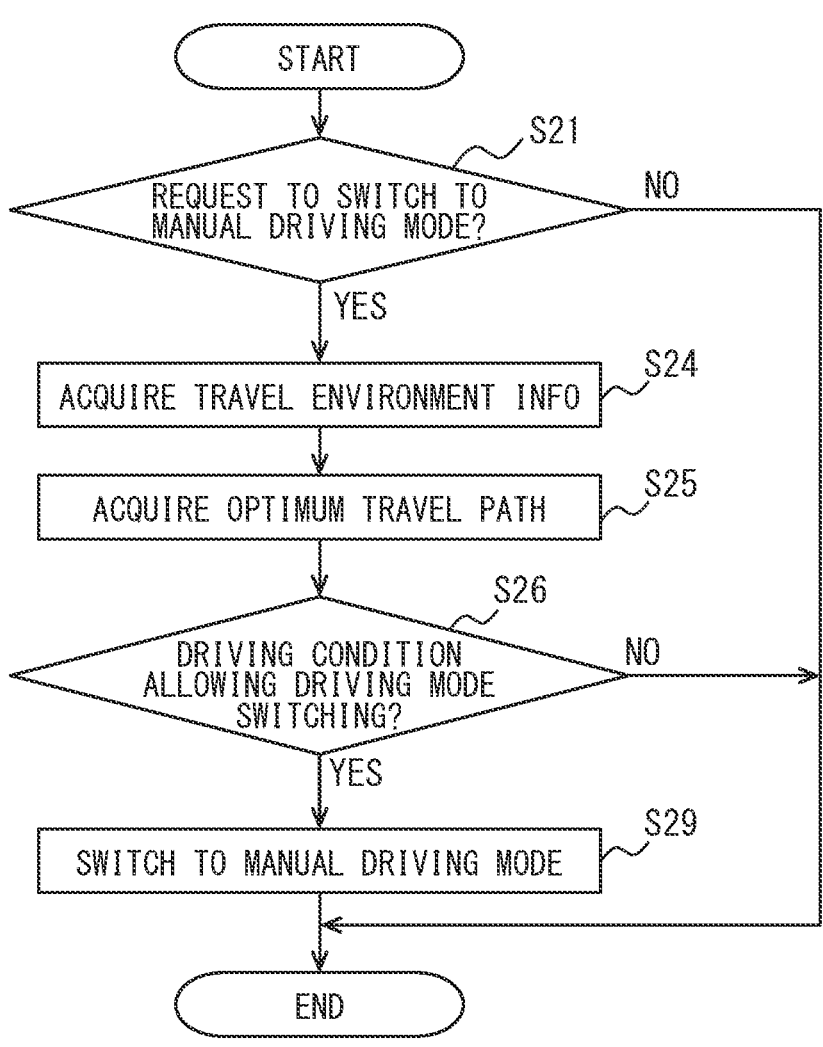
FIG. 13 is a diagram showing a process executed by a switching determination unit according to the sixth embodiment.

FIG. 13 shows a process executed by the switching determination unit 641 of the sixth embodiment. FIG. 13 differs from FIG. 11 in that S22 and S23 are eliminated from FIG. 11. The vehicle driving system 600 of the sixth embodiment includes an automatic driving device 420 that maintains a responsibility value RA for the travel path to be 0 (zero) during normal driving. Therefore, like the switching determination unit 441 of the fourth embodiment, S22 and S23 are not executed.

Seventh Embodiment

Figure 14:
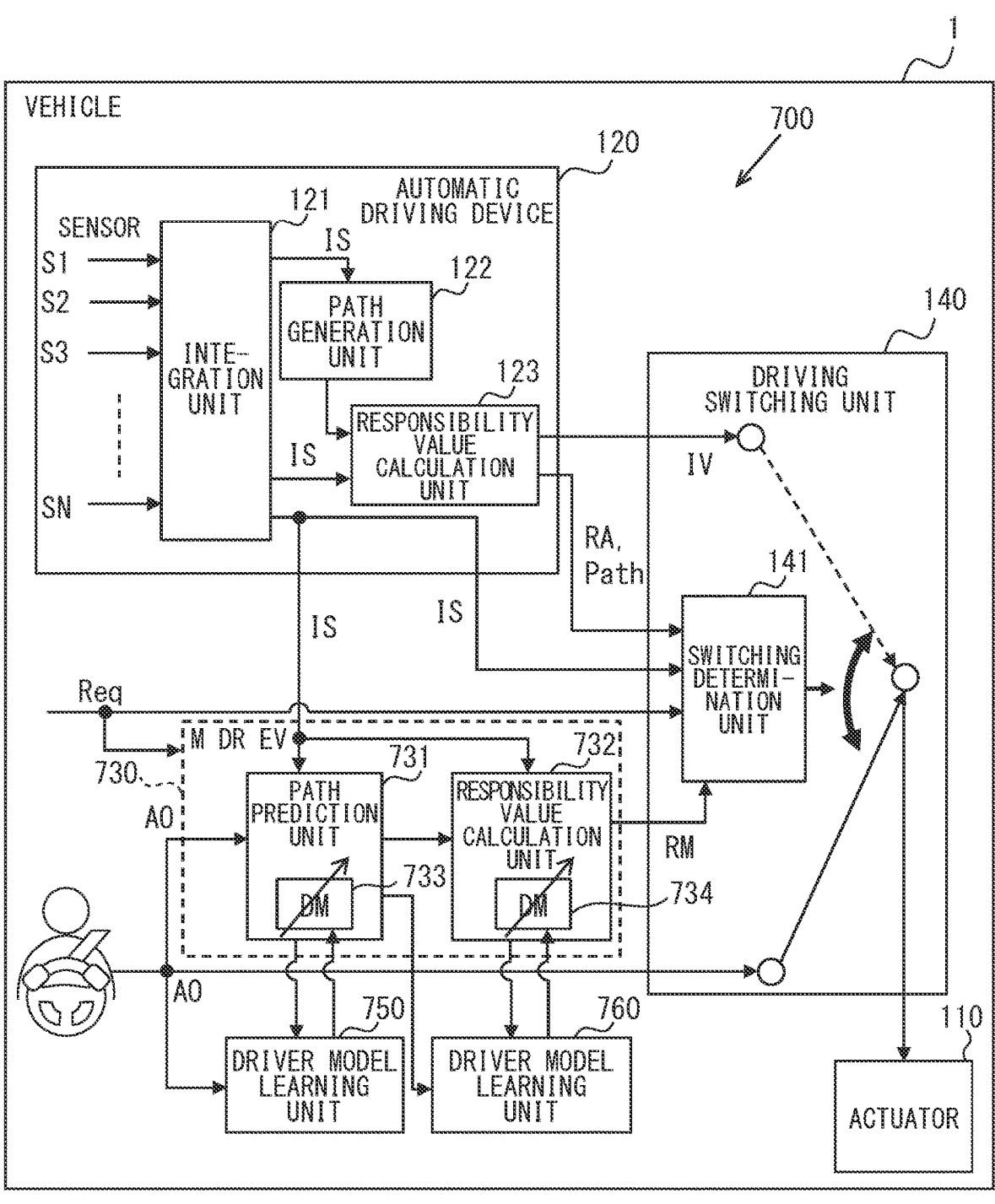
FIG. 14 is a diagram showing a configuration of a vehicle driving system according to a seventh embodiment.

FIG. 14 shows a configuration of a vehicle driving system 700 of a seventh embodiment. The vehicle driving system 700 includes a manual driving evaluation unit 730 instead of the manual driving evaluation unit 130. The manual driving evaluation unit 730 includes a path prediction unit 731 and a responsibility value calculation unit 732. The path prediction unit 731 is the same as the path prediction unit 131 of the first embodiment except that the driver model used is different from the path prediction unit 131 of the first embodiment. The responsibility value calculation unit 732 differs from the responsibility value calculation unit 132 of the first embodiment in that the responsibility value RM is calculated using the driver model 734.

The path prediction unit 731 and the responsibility value calculation unit 732 include driver models 733 and 734, respectively. These two driver models 733 and 734 are updated by learning. One driver model 733 is sequentially updated by the driver model learning unit 750. The other driver model 734 is sequentially updated by the driver model learning unit 760.

Figure 15:
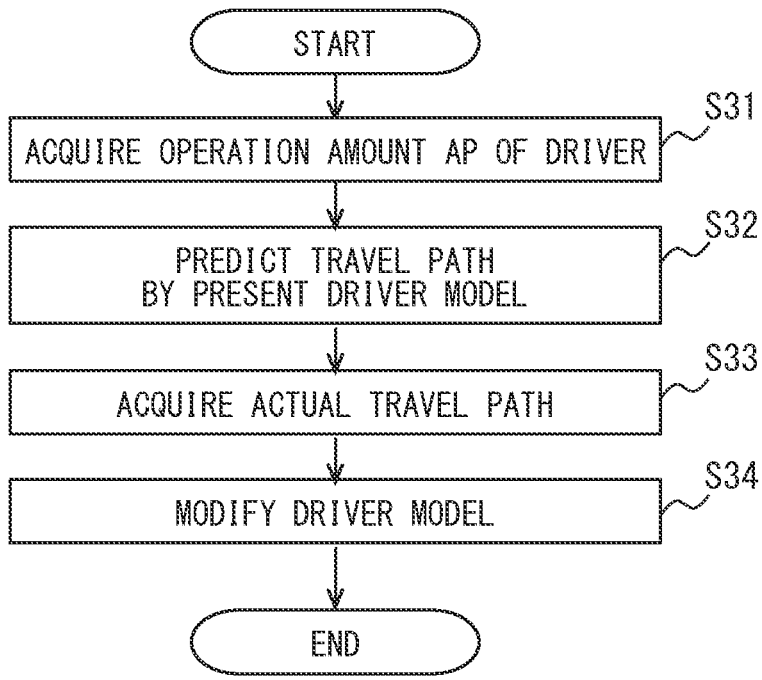
FIG. 15 is a diagram showing a process executed by a driver model learning unit in FIG. 14.

FIG. 15 shows a process executed by the driver model learning unit 750. In S31, the operation amount AO of the driver is acquired. In S32, the travel path is predicted by the current driver model 733. In S33, the travel path in which the host vehicle 1 actually travels is acquired. In S34, the travel path predicted in S32 and the travel path acquired in S33 are compared. Then, the driver model 733 is modified so that the predicted travel path approaches the travel path on which the host vehicle 1 actually travels.

The responsibility value calculation unit 732 calculates the responsibility value RM by manual driving by inputting the travel path predicted by the path prediction unit 731. The responsibility value RM becomes smaller as the possibility of deviating from the driving rule is lower. Therefore, in addition to the predicted travel path, it is possible to calculate the responsible value RM with high accuracy by considering how much the driver can drive according to the driving rule when traveling on the predicted travel path. Therefore, the responsibility value calculation unit 732 includes a driver model 734.

The responsibility value calculation unit 732 calculates the responsibility value RM by inputting the travel path predicted by the path prediction unit 731. Therefore, the driver model learning unit 760 that learns the driver model 734 included in the responsibility value calculation unit 732 performs the following processing.

That is, the driver model learning unit 760 acquires the travel path predicted by the path prediction unit 731, and calculates the responsibility value RM using the current driver model 734. In addition, the travel path actually traveled is acquired, and the responsibility value RM in the travel path is calculated. After that, the driver model 734 is modified so that the responsibility value RM calculated using the driver model 734 approaches the responsibility value RM calculated from the actual travel path.

By learning the driver models 733 and 734 included in the path prediction unit 731 and the responsibility value calculation unit 732 as in the seventh embodiment, the accuracy of the responsibility value RM is improved. As a result, the driving mode can be switched in a more appropriate situation.

Eighth Embodiment

Figure 16:
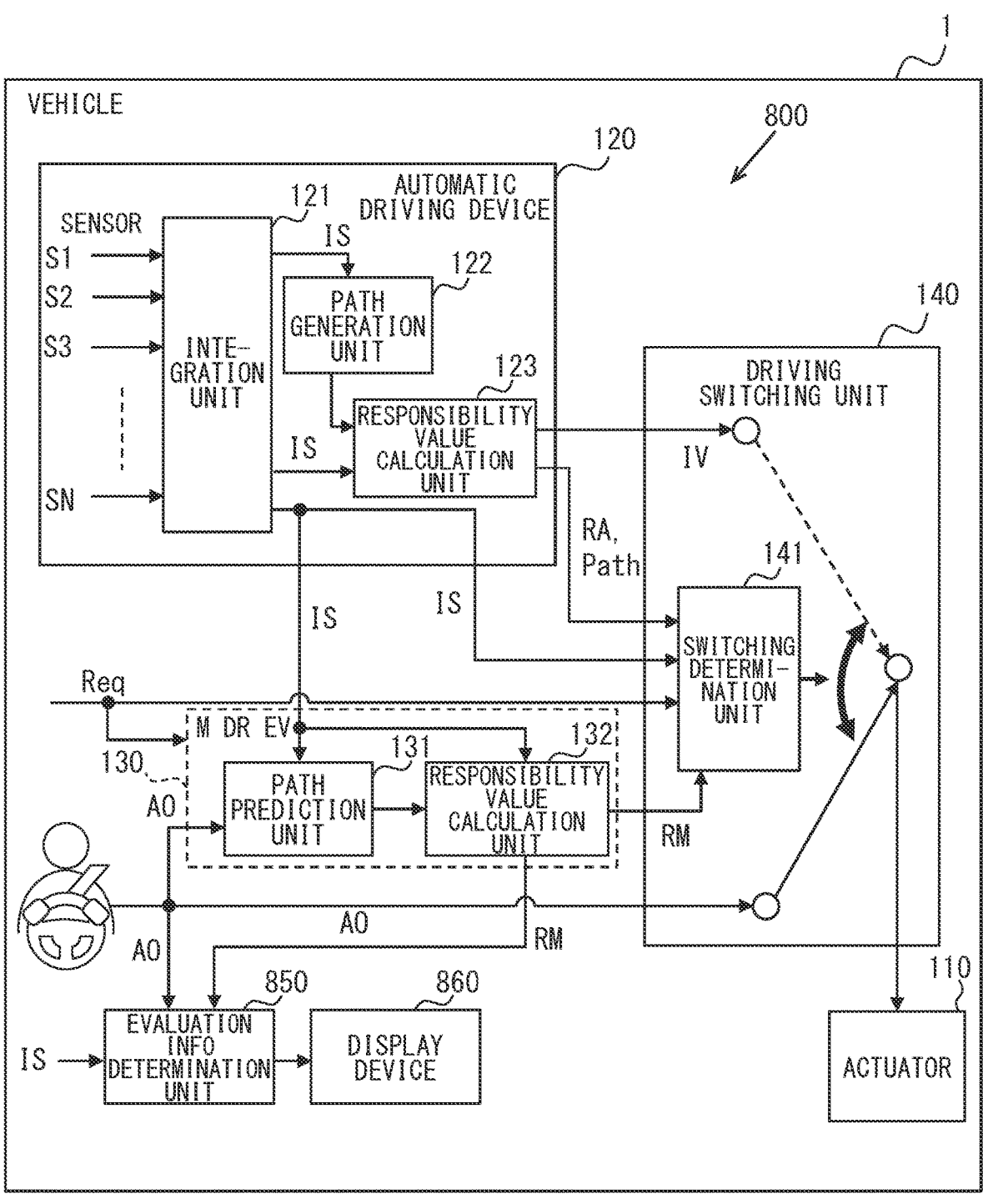
FIG. 16 is a diagram showing a configuration of a vehicle driving system according to an eighth embodiment.

FIG. 16 shows a configuration of a vehicle driving system 800 of an eighth embodiment. The vehicle driving system 800 includes an evaluation information determination unit 850 and a display device 860 in addition to the configuration provided in the vehicle driving system 100 of the first embodiment.

The evaluation information determination unit 850 can be realized by a configuration including a processor. The processor that realizes the evaluation information determination unit 850 may be the processor included in the automatic driving device 120 and the driving switching unit 140 or another processor.

The evaluation information determination unit 850 sequentially determines the evaluation information for evaluating the manual driving under execution (i.e., in progress) during the manual driving. The evaluation information evaluates whether or not the manual driving presently in progress is performed in which the switching permission condition on the manual driving side is satisfied. The switching permission condition on the manual driving side is a condition that the responsibility value RM by the manual driving is equal to or less than the allowable value on the manual side.

In this embodiment, as the evaluation value, "rate" shown in the following Expression 1 is calculated as the evaluation information.

$$\text{rate} = -\frac{1}{T}\sum_{t=0}^{T}\{(S_{St} - S_{dt})^2 + w\cdot(A_{St} - A_{dt})^2\}\cdot RM \qquad \text{[Expression 1]}$$

In Expression 1, T is a calculation period for calculating the evaluation value "rate", and t is an elapsed time from the start time of the calculation period T for the evaluation value "rate". The calculation period T can be arbitrarily set as long as it is equal to or less than each of (i) the time for traveling on the travel path generated by the path generation unit 122 and (ii) the time for traveling on the travel path predicted by the path prediction unit 131. For example, the calculation period T can be about several seconds. Ss is an amount of steering operation for the host vehicle 1 to travel on the travel path calculated by the automatic driving device 120. Sd is an amount of steering operation performed by the driver during the same period as Ss. As is an accelerator opening for the host vehicle 1 to travel on the travel path calculated by the automatic driving device 120. Ad is an amount of accelerator operation performed by the driver during the same period as As. w is a weighting factor. The behavior of the host vehicle 1 changes depending on the steering operation and the accelerator operation. The steering and accelerator are driving operation units operated by the driver to drive the host vehicle 1. Further, the steering operation amounts Ss and Sd and the accelerator operation amounts As and Ad are behavior-related values.

In the above Expression 1, before the responsibility value RM, there is shown an average value of (i) the difference between the steering operation amount by the automatic driving and the steering operation amount by the driver, and (ii) the difference between the accelerator operation amount by the automatic driving and the accelerator operation amount by the driver in the calculation period T. This average value is a value indicating the discrepancy between (i) the behavior-related value during manual driving and (ii) the behavior-related value when automatic driving is performed instead of manual driving.

The evaluation value "rate" obtained by multiplying this average value by the responsibility value RM is a value obtained by correcting the average value by the responsibility value RM. The evaluation value "rate" becomes a larger value as the responsibility of the responsibility value RM when the operation amount in the manual driving is separated from the operation amount in the automatic driving becomes larger. The responsibility value RM is a value determined at the start time (that is, t=0). Here, the responsibility value RM becomes smaller as the responsibility becomes lower. That is, the responsibility value RM becomes smaller as the possibility that the manual driving characteristic of the host vehicle 1 deviates from the driving rule is lower. The display device 860 is installed at a position where the driver can see it.

For example, the display device 860 can be a head-up display. The evaluation value "rate" sequentially determined by the evaluation information determination unit 850 is displayed on the display device 860.

When the accelerator operation amount and the steering operation amount by the automatic driving and the accelerator operation amount and the steering operation amount by the manual driving match throughout the calculation period T, the evaluation value "rate" becomes 0. In the automatic driving mode, control is continued so that the responsibility value RA becomes 0. Therefore, if the evaluation value "rate" is 0, the switching condition on the manual driving side is satisfied. In addition, it can be seen that the smaller the evaluation value "rate" is, the closer the switching condition on the manual driving side is satisfied.

During the manual driving, the evaluation value "rate" is sequentially determined and displayed on the display device

860, so that the driver can easily determine whether or not the manual driving mode can be switched to the automatic driving mode.

Ninth Embodiment

Figure 17:
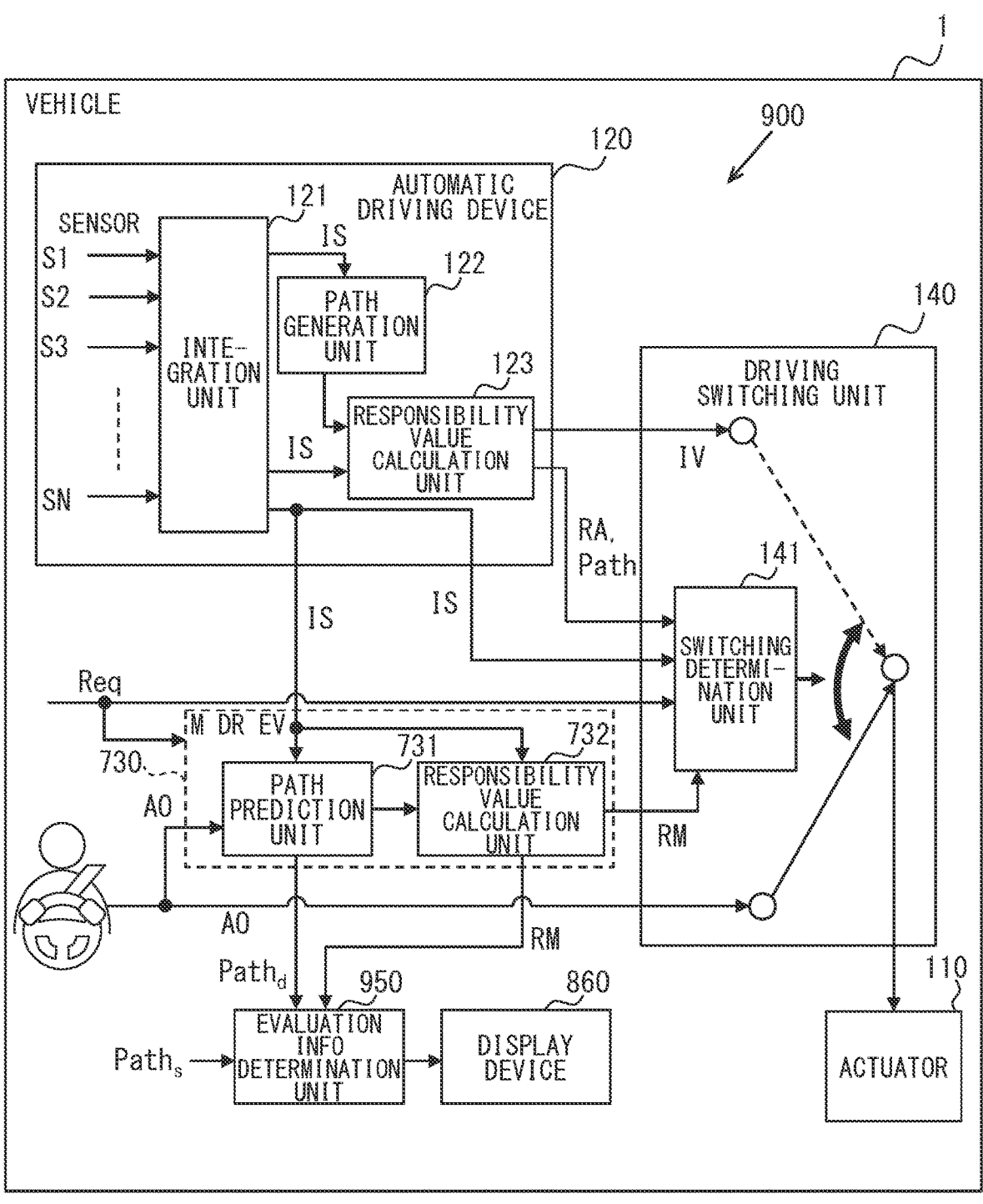
FIG. 17 is a diagram showing a configuration of a vehicle driving system according to a ninth embodiment.

FIG. 17 shows a configuration of a vehicle driving system 900 of a ninth embodiment. In the vehicle driving system 900, the process executed by the evaluation information determination unit 950 is different from the process executed by the evaluation information determination unit 850 in the vehicle driving system 800. Further, the vehicle driving system 900 includes a manual driving evaluation unit 730 provided in the vehicle driving system 700 of the seventh embodiment.

The evaluation information determination unit 950 also sequentially calculates the evaluation value "rate" during the manual driving. However, the evaluation information determination unit 950 calculates the evaluation value "rate" by the following Expression 2.

$$\text{rate} = -\frac{1}{T} \cdot \sum_{t=0}^{T} \{Path_s(t) - Path_d(t)\}^2 \cdot RM \qquad \text{[Expression 2]}$$

In Expression 2, "Paths" is a travel path generated by the path generation unit 122, and "Pathd" is a travel path generated by the path prediction unit 731. When the path prediction unit 731 generates a plurality of travel paths "Pathd", the travel path "Pathd" having the smallest responsible value RM among the plurality of travel paths "Pathds" is used for the calculation of Expression 2. "Paths(t)" and "Pathd(t)" indicate positions on the travel path at time t.

In the above Expression 2, before the responsibility value "RM", there is indicated the average value of the difference between the position of the host vehicle 1 by the automatic driving and the position of the host vehicle 1 by the manual driving in the calculation period "T". The travel path is a behavior-related value because it indicates a change in position as a result of the sequential behavior of the host vehicle 1. Therefore, also in expression 2, the above-mentioned average value is a value indicating a discrepancy between (i) the behavior-related value during manual driving and (ii) the behavior-related value when automatic driving is performed instead of manual driving.

This average value is multiplied by the responsibility value RM calculated by the responsibility value calculation unit 732. Since the responsibility value RM is multiplied, the evaluation value "rate" calculated by Expression 2 also indicates (i) whether or not the switching condition on the manual driving side is satisfied, and (ii) how close to the state where the switching condition on the manual driving side is satisfied with the magnitude of the evaluation value "rate".

By displaying the evaluation value "rate" calculated from Expression 2 on the display device 860, it becomes easy for the driver to determine whether or not the manual driving mode can be switched to the automatic driving mode.

Further, in Expression 2, the travel path "Pathd" predicted by the path prediction unit 131 is used as an input value, and the path prediction unit 731 determines the travel path "Pathd" using the learned driver model. Therefore, the evaluation value "rate" can be calculated by reflecting the intention of the driver.

Tenth Embodiment

Figure 18:
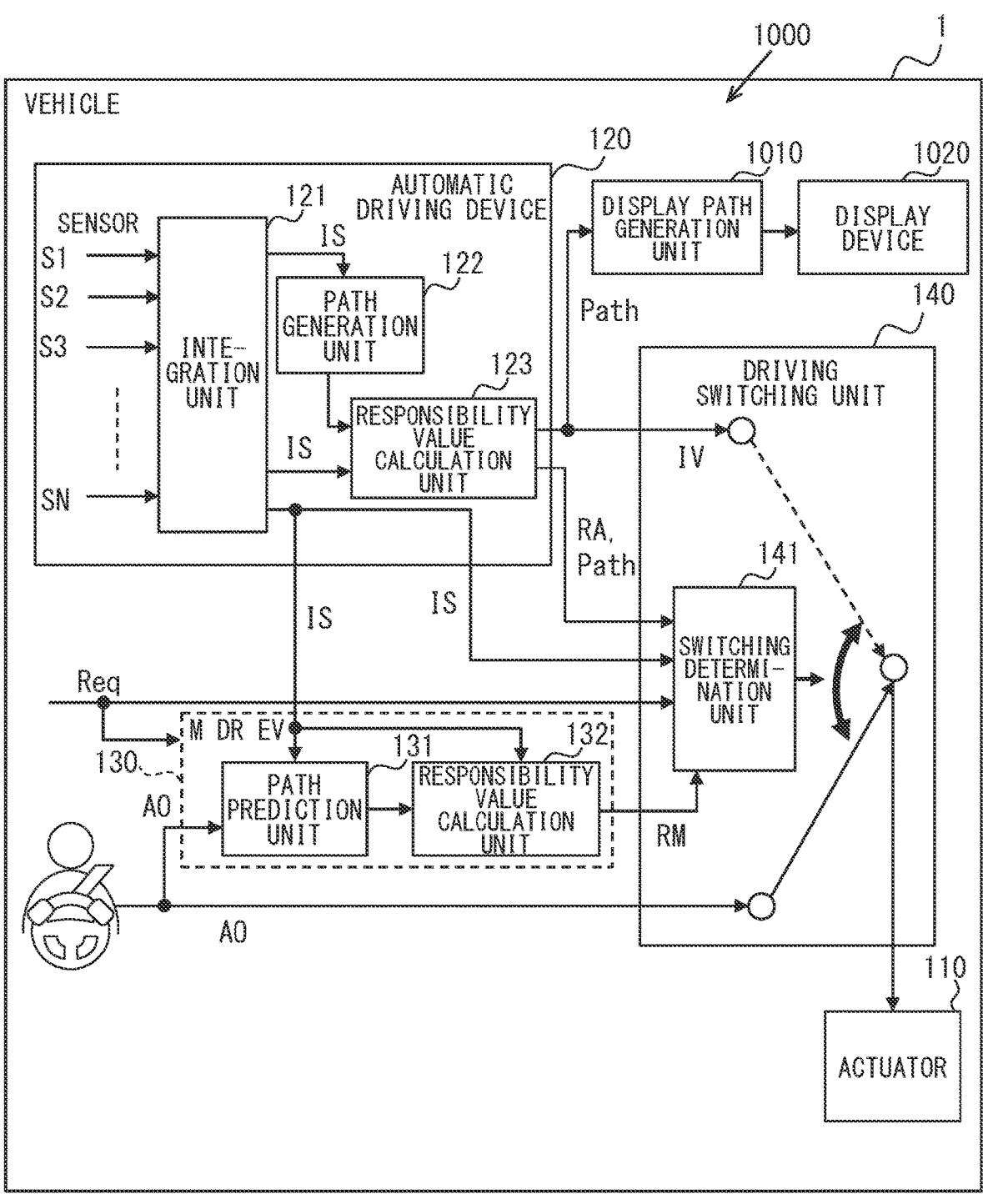
FIG. 18 is a diagram showing a configuration of a vehicle driving system according to a tenth embodiment.

FIG. 18 shows a configuration of a vehicle driving system 1000 of a tenth embodiment. Comparing the vehicle driving system 1000 with the vehicle driving system 800 of the eighth embodiment, the vehicle driving system 1000 does not include an evaluation information determination unit 850 and a display device 860, but instead includes a display path generation unit 1010 and a display device 1020.

The display path generation unit 1010 acquires the optimum travel path from the responsibility value calculation unit 123, and generates a travel path image to be displayed on the display device 1020 based on the acquired travel path. The travel path image is an image in which the driver can recognize what kind of path is the optimum travel path on the actual road in front of the driver. For example, suppose a case the display device 1020 is a head-up display capable of displaying an image so as to overlap the front scenery. In such a case, the travel path image is an image that overlaps with a portion that becomes the optimum travel path on the road surface ahead when viewed from the driver.

In this way, the optimum travel path generated by the automatic driving device 120 may be displayed on the display device 1020 during manual driving. The driver can thereby easily switch to the automatic driving mode by driving and operating the host vehicle 1 so as to travel on the travel path.

Eleventh Embodiment

Figure 19:
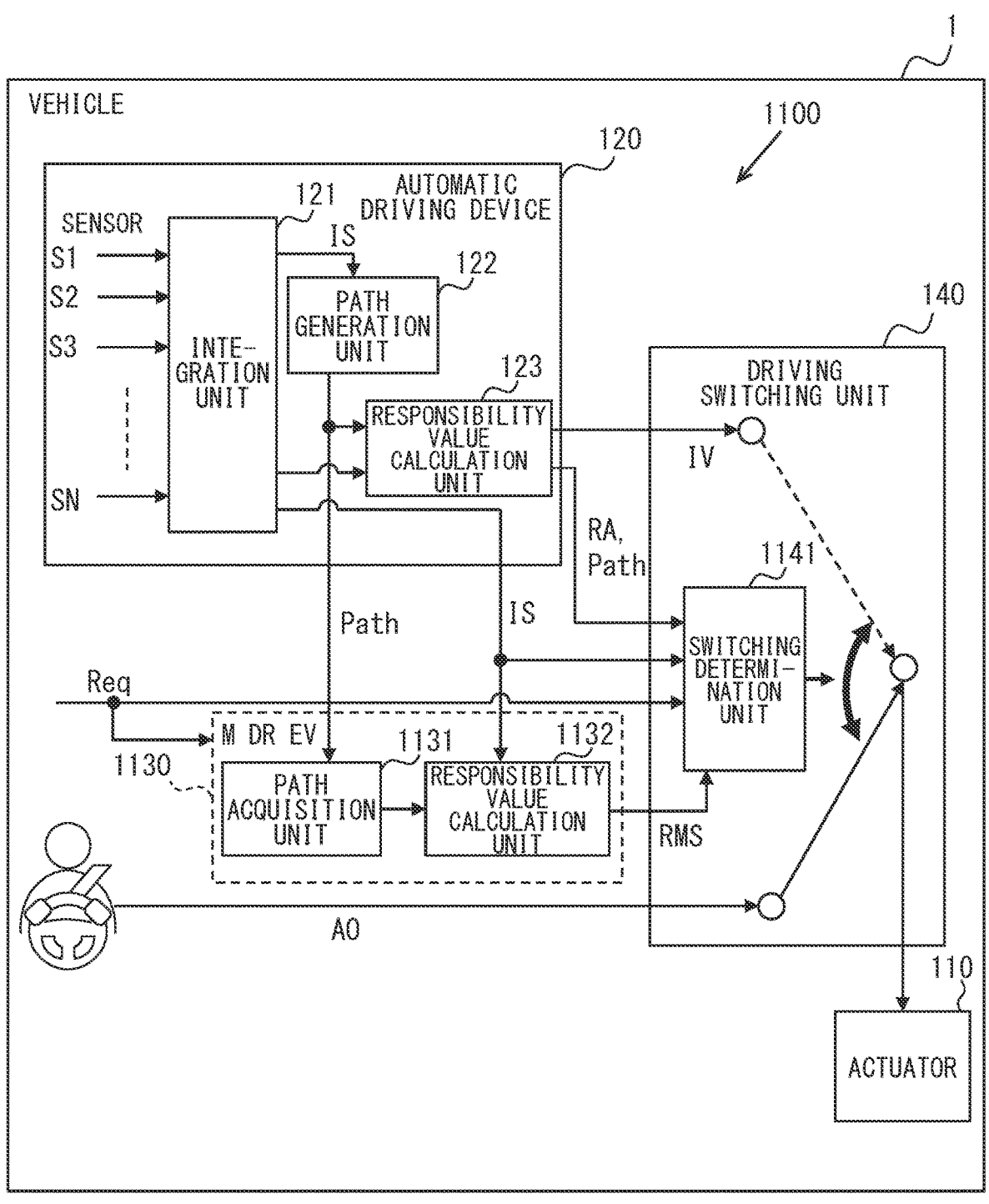
FIG. 19 is a diagram showing a configuration of a vehicle driving system according to an eleventh embodiment.

FIG. 19 shows a configuration of a vehicle driving system 1100 of an eleventh embodiment. The vehicle driving system 1100 includes a manual driving evaluation unit 1130 having a function different from that of the manual driving evaluation unit 130 described in the first embodiment. The manual driving evaluation unit 1130 can be realized by a configuration including at least one processor. In FIG. 19, the manual driving evaluation unit 1130 is shown separately from the automatic driving device 120 and the switching determination unit 1141. However, the automatic driving device 120 or the switching determination unit 1141 may include a manual driving evaluation unit 1130.

The manual driving evaluation unit 1130 includes a path acquisition unit 1131 and a responsibility value calculation unit 1132. The manual driving evaluation unit 130 and the manual driving evaluation unit 1130 are common in that the responsibility value for manual driving is calculated. The manual driving evaluation unit 130 and the manual driving evaluation unit 1130 are different from each other in that the travel path used for calculating the responsibility value is different. The manual driving evaluation unit 130 predicts the travel path from the driver's operation amount AO. On the other hand, the manual driving evaluation unit 1130 uses the travel path generated by the automatic driving device 120.

Due to the above differences, the manual driving evaluation unit 1130 includes a path acquisition unit 1131. The path acquisition unit 1131 acquires an automatic travel path from the path generation unit 122, and outputs the automatic travel path to the responsibility value calculation unit 1132. That is, when the path generation unit 122 generates a plurality of automatic travel paths, all of the plurality of automatic travel paths can be acquired and output to the responsibility value calculation unit 1132.

The responsibility value calculation unit 1132 calculates the responsibility value on the assumption that the travel path when traveling by manual driving is the automatic travel path (i.e., the travel path generated by the automatic driving device 120). In the present embodiment, the characteristic of the host vehicle 1 based on this assumption is referred to as an assumed manual driving characteristic. The responsibility value calculation unit 1132 substitutes the automatic travel path and the sensor-based information IS into the calculation expression for calculating the responsibility value, and calculates the responsibility value. The responsibility value calculated by the responsibility value calculation unit 1132 is hereinafter referred to as a responsibility value RMS.

The responsibility value RMS represents the responsibility value when it is assumed that the travel path when traveling by manual driving becomes an automatic travel path. The responsibility value RMS is calculated for each target vehicle in the same manner as the responsibility value RM.

A calculation expression for the responsibility value calculation unit 1132 to calculate the responsibility value RMS is set in advance. This calculation expression by the responsibility value calculation unit 1132 is different from the calculation expression by the responsibility value calculation unit 123 only in coefficients. Both automatic driving and manual driving are the same in that the actuator 110 is operated to control the behavior of the host vehicle 1. Therefore, if the coefficients are changed, the responsibility value RMS can be calculated using the calculation expression used by the responsibility value calculation unit 123. The reason why the coefficients are different is that the ability of acceleration/deceleration control and steering control is different between the automatic driving device 120 and the driver.

Further, the calculation expression used by the responsibility value calculation unit 1132 may be different in not only a coefficient but also a calculation expression. The driver inputs the operating force for controlling the host vehicle 1 to the accelerator, the brake, and the steering wheel. On the other hand, the transmission route via which the signal for controlling the host vehicle 1 by the automatic driving device 120 is transmitted is different from the transmission route via which the above-mentioned operating force input by the driver is transmitted. In consideration of this situation or other circumstances, the calculation expression used by the responsibility value calculation unit 1132 may be different in not only a coefficient but also a calculation expression. Further, as the calculation expression used by the responsibility value calculation unit 1132, a common one may be used regardless of who the driver is, or another driver-specific calculation expression may be used.

The responsibility value calculation unit 1132 calculates the responsibility value RMS when the driving mode switching request Req is input. Alternatively, the responsibility value calculation unit 1132 may periodically calculate the responsibility value RMS while in the automatic driving mode.

The responsibility value calculation unit 1132 outputs the calculated responsibility value RMS to the switching determination unit 1141 included in the driving switching unit 140. When a plurality of automatic traveling paths are input, the responsibility value calculation unit 1132 calculates the responsibility value RMS for each of the plurality of automatic travel paths. Then, the responsibility value RMS for at least one automatic travel path determined by the output condition is output to the switching determination unit 1141 from a plurality of automatic travel paths.

The output condition is, for example, the condition that the degree of responsibility is the highest. This is because if the travel path that has the greatest degree of responsibility is used, the determination of switching the driving mode can be the determination that is most difficult to deviate from the driving rule. Further, the output condition may be a condition that the responsibility value RMS for each of all the travel paths is output. Here, the responsibility value RMS becomes smaller as the responsibility becomes lower. That is, the responsibility value RMS becomes smaller as the possibility that the assumed manual driving characteristic of the host vehicle 1 deviates from the driving rule is lower.

Figure 20:
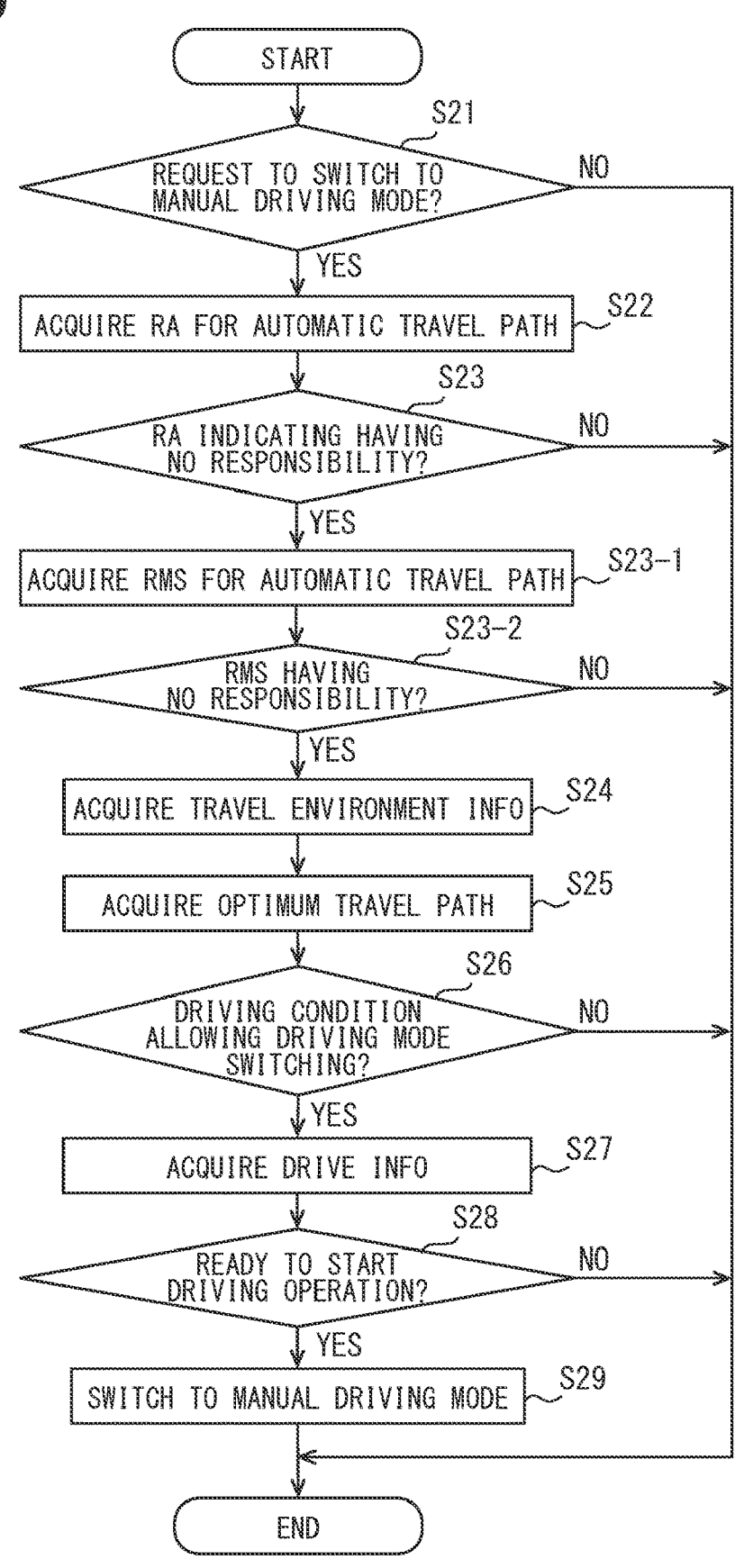
FIG. 20 is a diagram showing a process executed by a switching determination unit according to an eleventh embodiment.

The driving switching unit 140 includes a switching determination unit 1141. The switching determination unit 1141 determines whether or not to switch the authority to perform driving operation of the host vehicle 1. FIG. 20 shows a flowchart of the process executed by the switching determination unit 1141. The switching determination unit 1141 periodically executes the process shown in FIG. 20. The process shown in FIG. 20 is a process in which S23-1 and S23-2 are added to the process shown in FIG. 7.

In FIG. 20, S21, S22, and S23 are the same as S21, S22, and S23 in FIG. 20. In S21, it is determined whether or not there is a request to switch to the manual driving mode. The request to switch to the manual driving mode is a request made by the driver. The time when a request to switch to the manual driving mode has occurred should be during the automatic driving mode.

When it is determined that the request for switching to the manual driving mode has been made, S22 and S23 are executed to determine whether the responsibility value RA is a value that means having no responsibility. Then, when it is determined that the responsibility value RA is a value meaning having no responsibility, the process proceeds to S23-1. Here, the responsibility value RA becomes smaller as the responsibility is lower. That is, the responsibility value RA becomes a smaller value as the possibility that the automatic driving characteristic of the host vehicle 1 deviates from the driving rule becomes smaller, and having no responsibility means that the possibility of deviating from the driving rule is low.

S23-1 is a process as a responsibility value acquisition unit, and acquires the responsibility value RMS for the automatic travel path from the responsibility value calculation unit 1132. In the following S23-2, it is determined whether or not the responsibility value RMS acquired in S23-1 is a value meaning having no responsibility. This determination is the same as S14 except that the responsibility value RMS is used instead of the responsibility value RM.

When the determination result in S23-2 is NO, the process shown in FIG. 20 is terminated. When the determination result of S23-2 is YES, S24 and subsequent is executed as in FIG. 7.

In the eleventh embodiment, when a request to switch to the manual driving mode occurs (S21: YES), the responsibility value RMS assuming manual driving is acquired while the automatic driving mode is being executed or in progress (S23-1). The condition for switching to the manual driving mode includes that the responsibility value RMS indicates a value having no responsible (S23-2).

Therefore, when the driver switches to the manual driving mode, it is possible to prevent the driver from deviating from the driving rule due to the manual driving. In addition, it is possible to suppress sudden behavior due to switching to the manual driving mode.

Further, in the present embodiment, the mode is switched to the manual driving mode on the condition that the responsibility value RA by the automatic driving indicates having no responsible (S23: YES). Therefore, it is possible to further suppress the lack of smoothness at the time of switching.

Twelfth Embodiment

Figure 21:
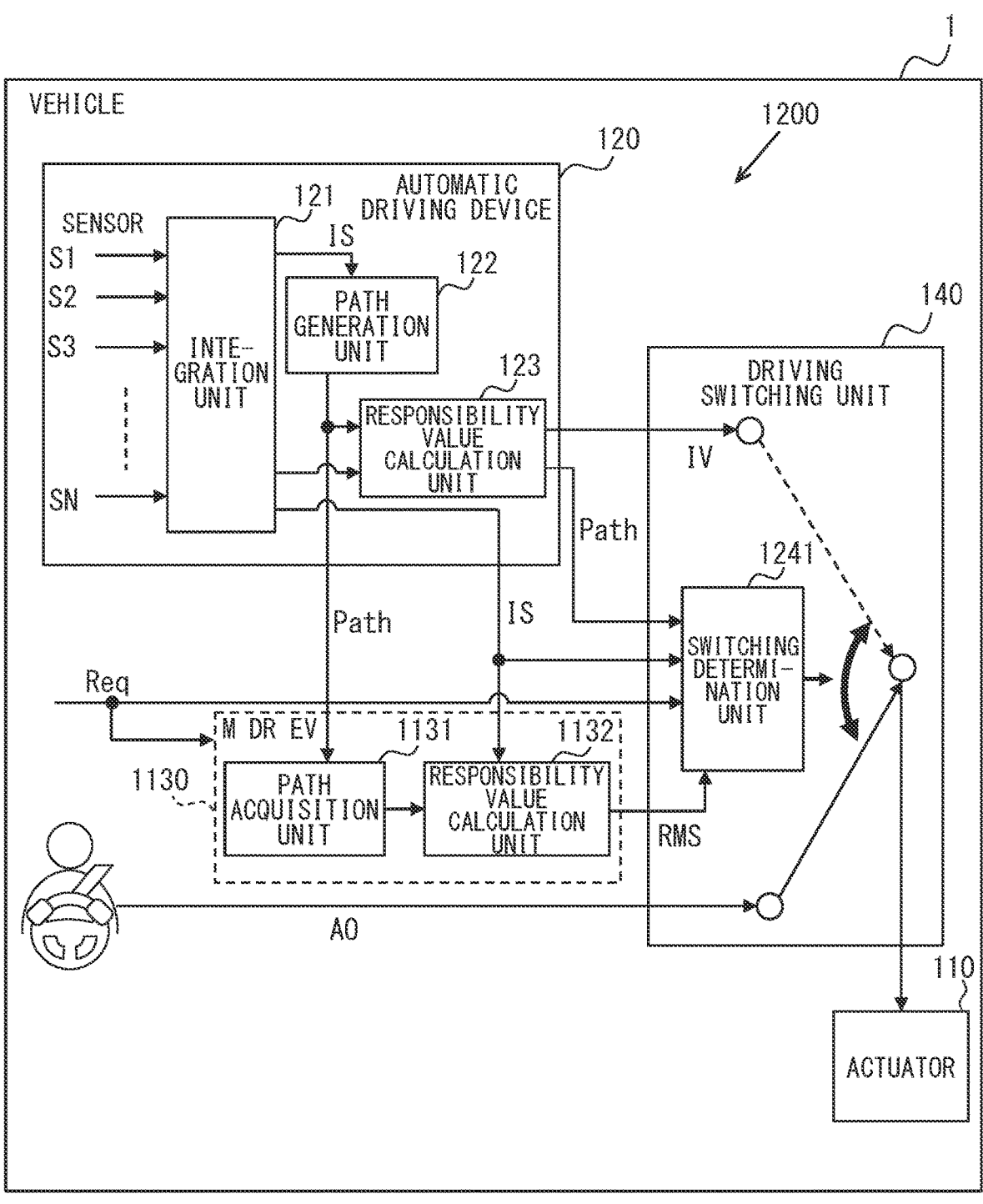
FIG. 21 is a diagram showing a configuration of a vehicle driving system according to a twelfth embodiment.

FIG. 21 shows a configuration of a vehicle driving system 1200 of a twelfth embodiment. The vehicle driving system 1200 includes a driving switching unit 140 and a manual driving evaluation unit 1130, as in the vehicle driving system 1100 of the eleventh embodiment.

The driving switching unit 140 includes a switching determination unit 1241. The switching determination unit 1141 of the eleventh embodiment acquires the responsibility value RA and the travel path from the automatic driving device 120. On the other hand, the switching determination unit 1241 acquires the travel path from the automatic driving device 120, but does not acquire the responsibility value RA.

Figure 22:
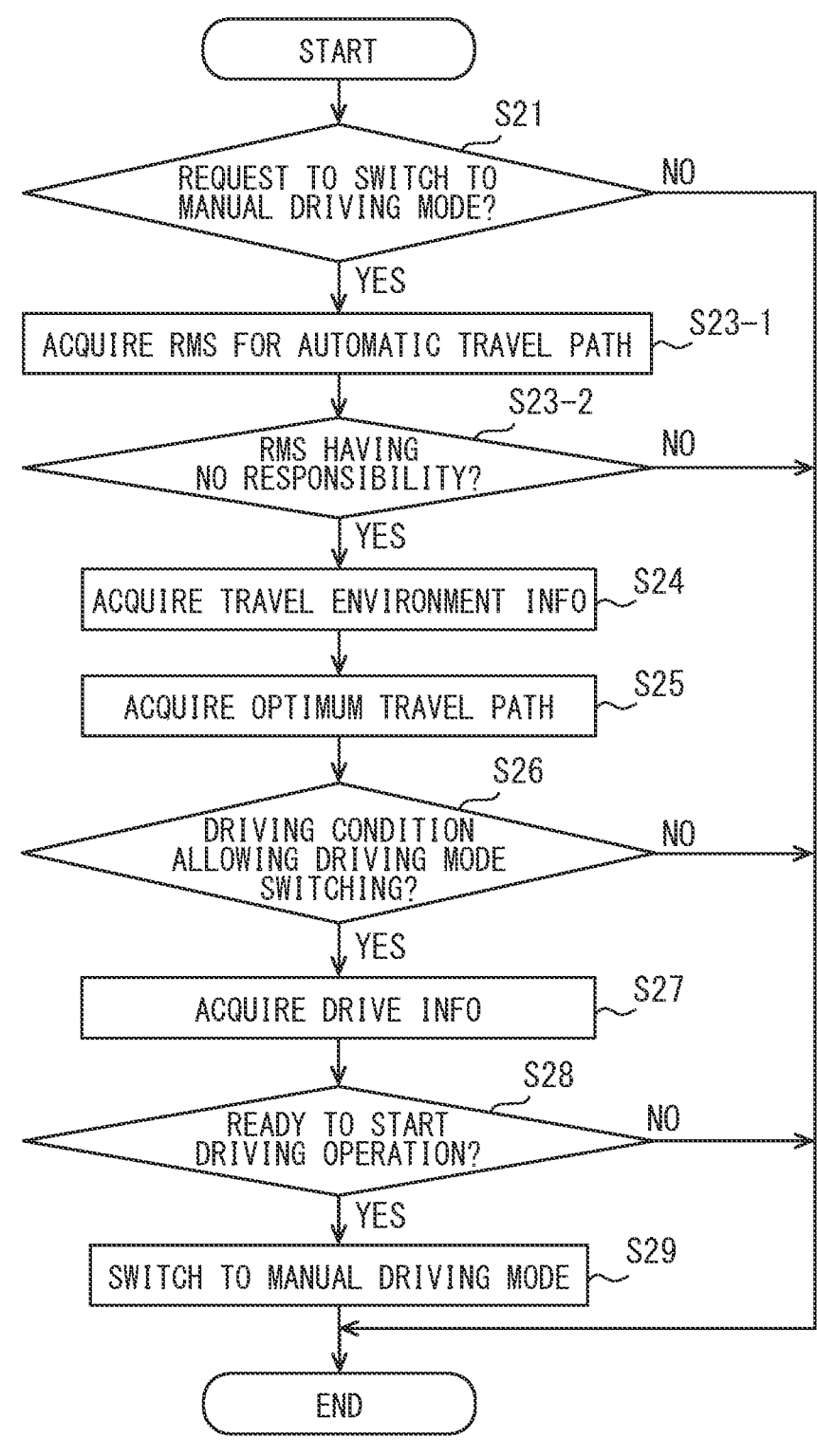
FIG. 22 is a diagram showing a process executed by a switching determination unit according to a twelfth embodiment.

The switching determination unit 1241 executes the process shown in FIG. 22 to determine whether or not to switch the authority to perform driving operation of the host vehicle 1. The process shown in FIG. 22 is a process in which S22 and S23 are omitted from the process shown in FIG. 20. That is, the switching determination unit 1241 determines whether or not to switch to the manual driving mode without determining whether or not the responsibility value RA indicates having no responsibility.

The reason for not determining whether the responsibility value RA indicates having no responsibility is that when comparing the responsibility value RA and the responsibility value RMS during driving in the automatic driving mode, in most cases or always, the responsibility value RA has a lower degree of responsibility.

Therefore, if it can be determined that the responsibility value RMS indicates having no responsibility, the responsibility value RA is assumed to also indicate having no responsibility, that is, the responsibility value RA can be regarded as being equal to or less than the automatic side allowable value. Of course, the coefficient of the calculation expression for calculating the responsibility value RMS may be adjusted so that the responsibility value RA has a lower degree of responsibility than the responsibility value RMS. Here, the responsibility value RA becomes smaller as the responsibility is lower. That is, the responsibility value RA becomes a smaller value as the possibility that the automatic driving characteristic of the host vehicle 1 deviates from the driving rule becomes smaller, and that having no responsibility means that the possibility of deviating from the driving rule is low.

In the twelfth embodiment, it is determined whether or not to switch to the manual driving mode without determining whether or not the responsibility value RA is a value that indicates having no responsibility, so that the calculation load can be reduced.

Thirteenth Embodiment

Figure 23:
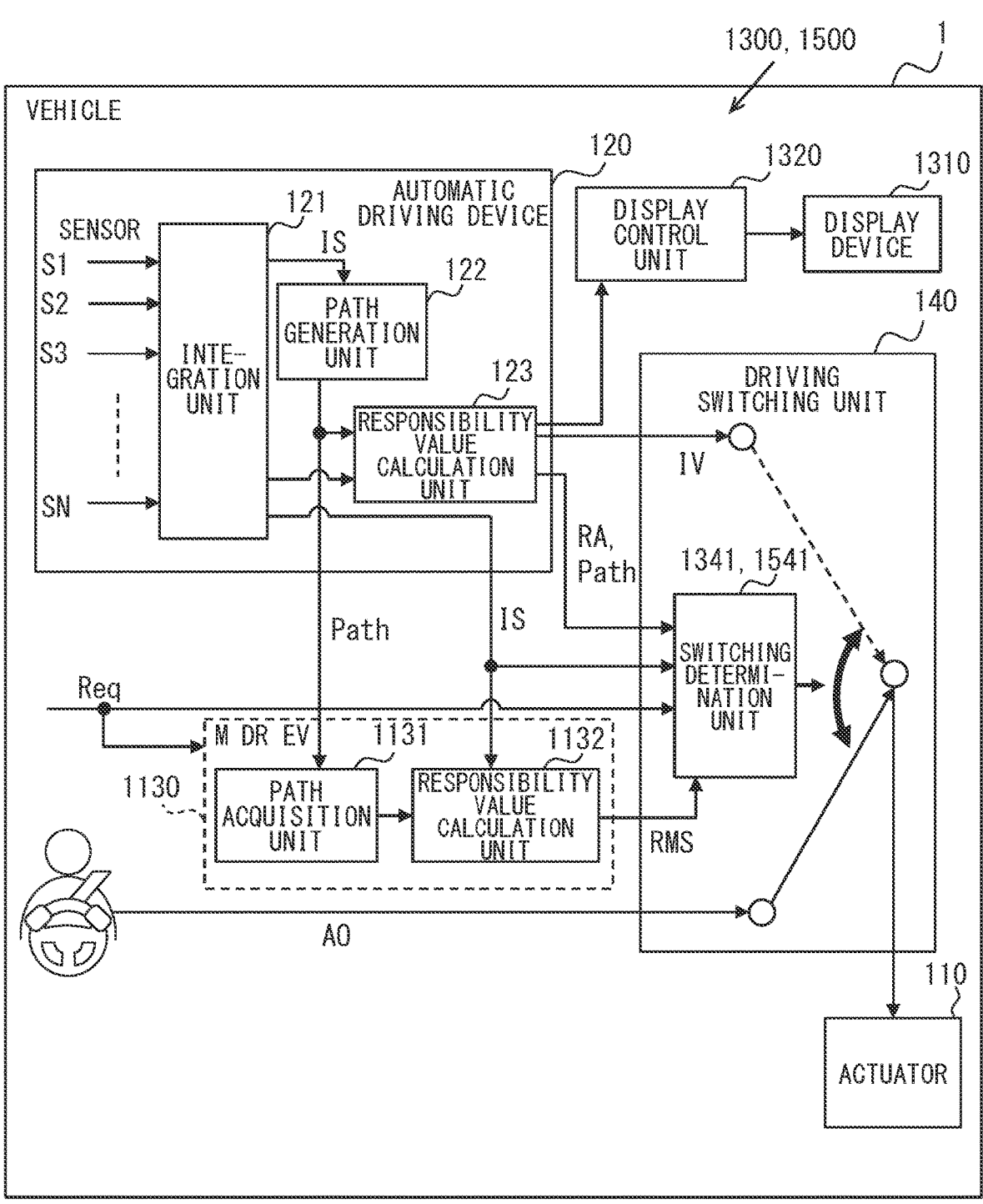
FIG. 23 is a diagram showing a configuration of a vehicle driving system according to a thirteenth embodiment.

FIG. 23 shows a configuration of a vehicle driving system 1300 of a thirteenth embodiment. The vehicle driving system 1300 includes an automatic driving device 120, a driving switching unit 140, and a manual driving evaluation unit 1130 described in the previous embodiments. In addition, the vehicle driving system 1300 includes a display device 1310, a display control unit 1320, and a switching determination unit 1341.

The automated driving device 120 in this embodiment performs level 3 automatic driving control, at least in some situations. Level 3 automatic driving control performs automatic driving control that requires none of driver operation if the situation allows automatic driving. However, when the automatic driving control becomes difficult, the driving authority is transferred to the driver by the request from the automatic driving device 120.

When the automatic driving control becomes difficult, the responsibility value calculation unit 123 outputs a switching request for switching the driving mode to the manual driving mode, to the switching determination unit 1341. An example of a situation where automatic driving control is difficult is a situation where the travel environment is outside the ODD (Operational Design Domain). The situation where the travel environment is outside the ODD will be described in a fifteenth embodiment.

The display device 1310 is installed at a position where the driver can see it, and displays various information. The display device 1310 is, for example, a head-up display. The display control unit 1320 is connected to the automatic driving device 120, and acquires a signal indicating a switching request for switching the driving mode from the automatic driving mode to the manual driving mode, from the automatic driving device 120. When this signal is acquired, the display control unit 1320 displays on the display device 1310 a character or a figure for informing the driver that the driving authority is transferred, that is, the driving mode is switched to the manual driving mode.

The driving switching unit 140 includes a switching determination unit 1341. The switching determination unit 1341 determines whether or not to switch the authority to perform driving operation of the host vehicle 1 by a process different from the switching determination units 1141 and 1241 described in the eleventh and twelfth embodiments.

Figure 24:
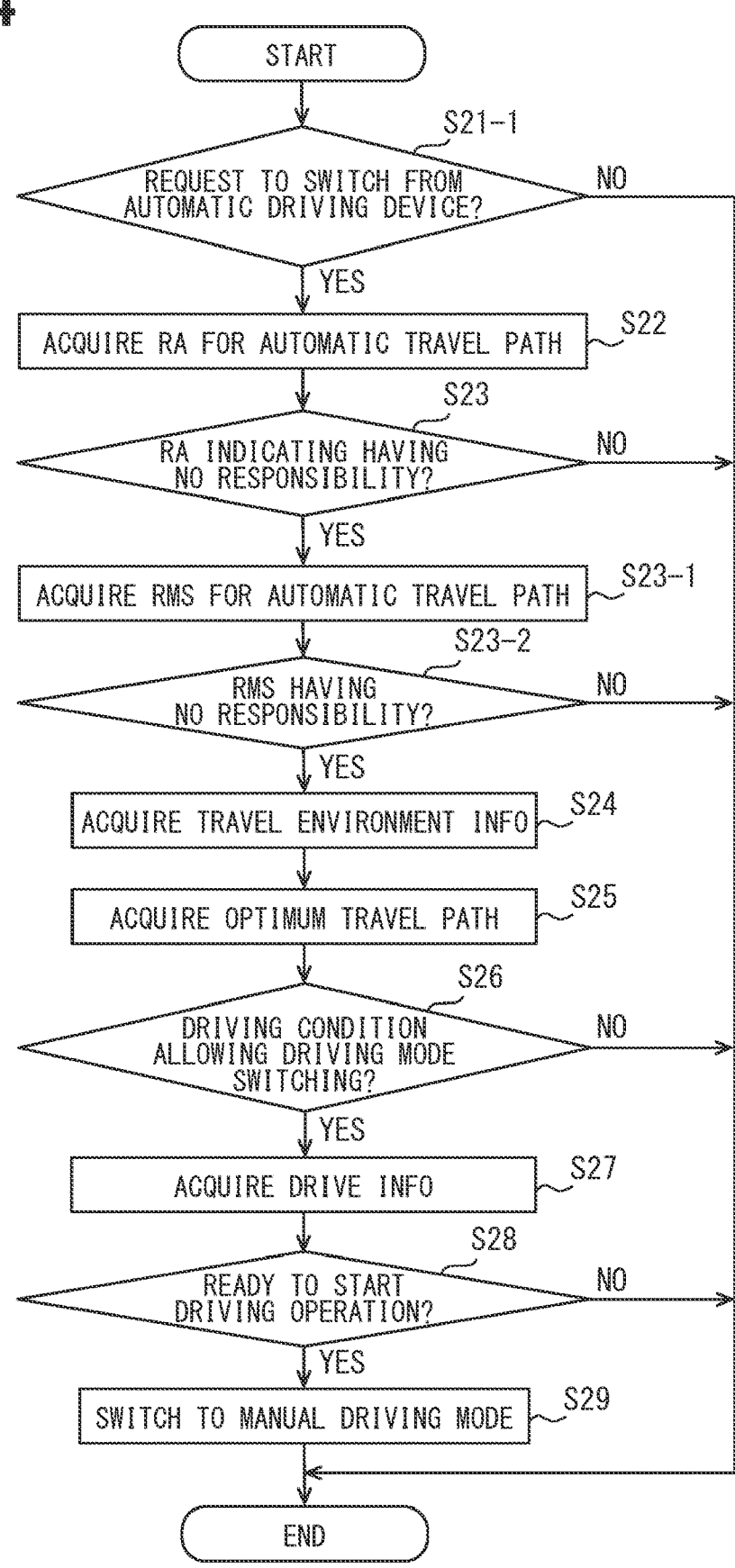
FIG. 24 is a diagram showing a process executed by a switching determination unit according to a thirteenth embodiment.

FIG. 24 shows a flowchart of the process executed by the switching determination unit 1341. The switching determination unit 1341 periodically executes the process shown in FIG. 24. The process shown in FIG. 24 is a process of executing S21-1 instead of S21 in the process shown in FIG. 20.

In S21-1, it is determined whether or not there is a switching request from the automatic driving device 120. When the determination result of S21-1 is NO, the process shown in FIG. 24 is terminated. When the determination result of S21-1 is YES, S22 and subsequent are executed. When the determination result of S21-1 is YES, the display control unit 1320 displays on the display device 1310 a character or a figure for informing the driver that the driving mode is switched to the manual driving mode.

Suppose a case where the driving mode may be switched to the manual driving mode by the request from the automatic driving device 120. Also in such a case as well, the present embodiment can prevent the driver from deviating from the driving rule and prevent the sudden behavior from occurring due to switching to the manual driving mode.

Fourteenth Embodiment

Figure 25:
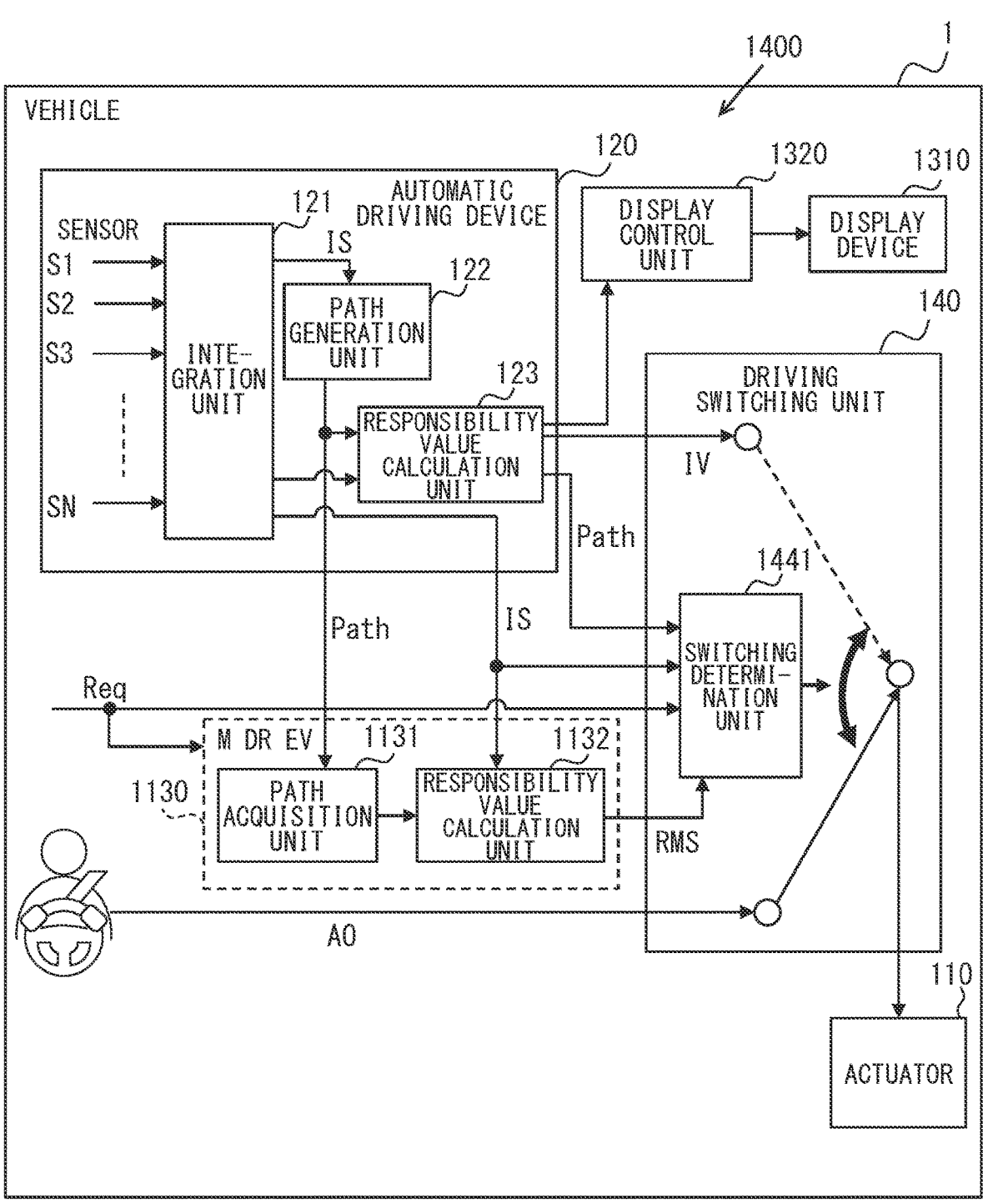
FIG. 25 is a diagram showing a configuration of a vehicle driving system according to a fourteenth embodiment.

FIG. 25 shows a configuration of a vehicle driving system 1400 of a fourteenth embodiment. Similar to the vehicle driving system 1300 of the thirteenth embodiment, the vehicle driving system 1400 includes an automatic driving device 120, a driving switching unit 140, a manual driving evaluation unit 1130, a display device 1310, and a display control unit 1320.

The driving switching unit 140 includes a switching determination unit 1441. The switching determination unit 1441 acquires the travel path from the automatic driving device 120, but does not acquire the responsibility value RA.

Figure 26:
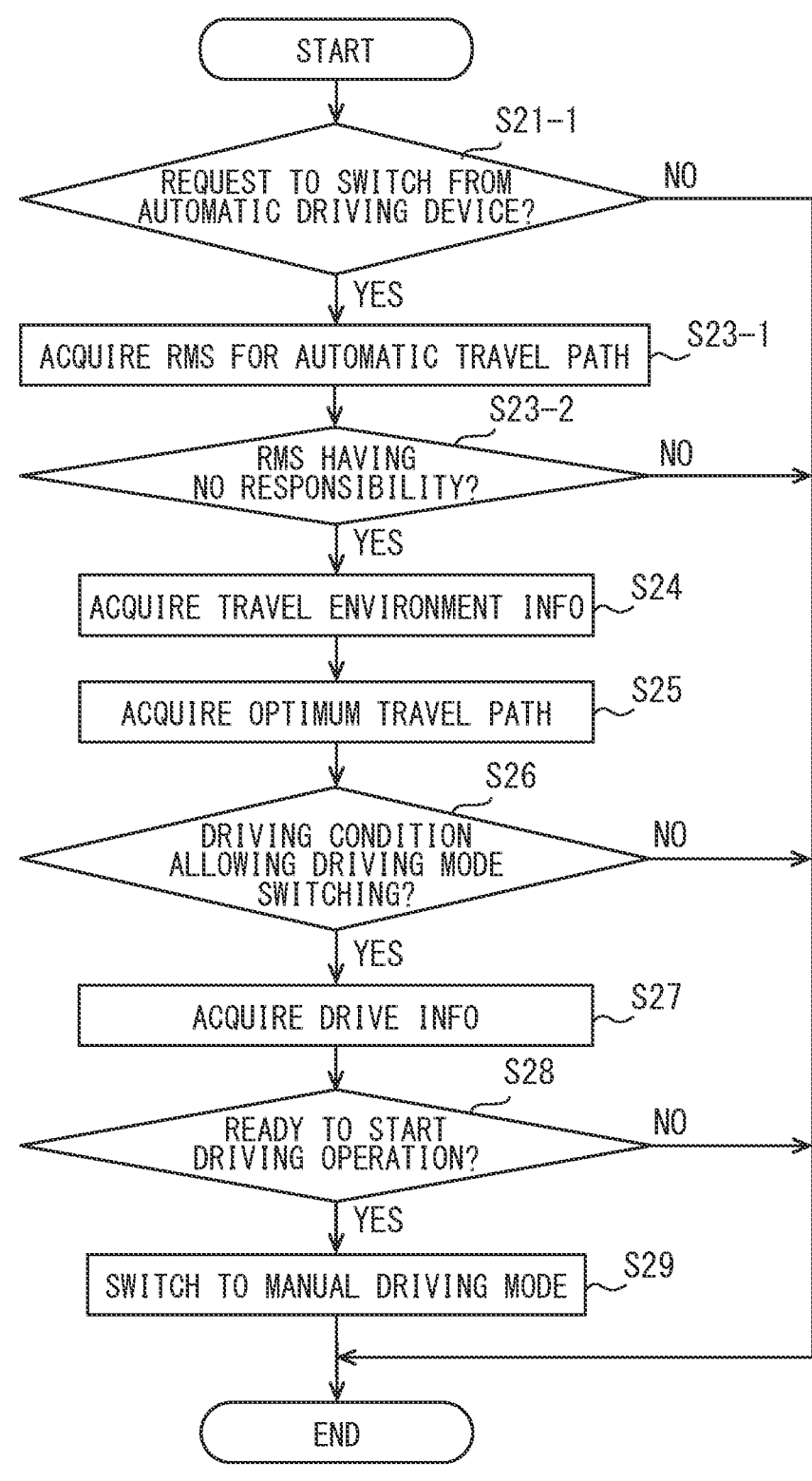
FIG. 26 is a diagram showing a process executed by a switching determination unit according to the fourteenth embodiment.

The switching determination unit 1441 executes the process shown in FIG. 26 to determine whether or not to switch the authority to perform driving operation of the host vehicle 1. The process shown in FIG. 26 is a process in which S22 and S23 are omitted from the process shown in FIG. 24. That is, the switching determination unit 1441 determines whether or not to switch to the manual driving mode without determining whether or not the responsibility value RA is a value that indicates having no responsibility. The reason for not determining whether the responsibility value RA is a value that indicates no responsibility is the same as the reason described in the twelfth embodiment. Here, the responsibility value RA becomes smaller as the responsibility is lower. That is, the responsibility value RA becomes a smaller value as the possibility that the automatic driving characteristic of the host vehicle 1 deviates from the driving rule becomes smaller, and having no responsibility means that the possibility of deviating from the driving rule is low.

In the fourteenth embodiment, it is determined whether or not to switch to the manual driving mode without determining whether or not the responsibility value RA is a value that indicates no responsibility, so that the calculation load can be reduced.

Fifteenth Embodiment

FIG. 23 shows a configuration of a vehicle driving system 1500 of a fifteenth embodiment, which is the same as that of the vehicle driving system 1300. That is, the vehicle driving system 1500 includes an automatic driving device 120, a driving switching unit 140, a manual driving evaluation unit 1130, a display device 1310, and a display control unit 1320.

Figure 27:
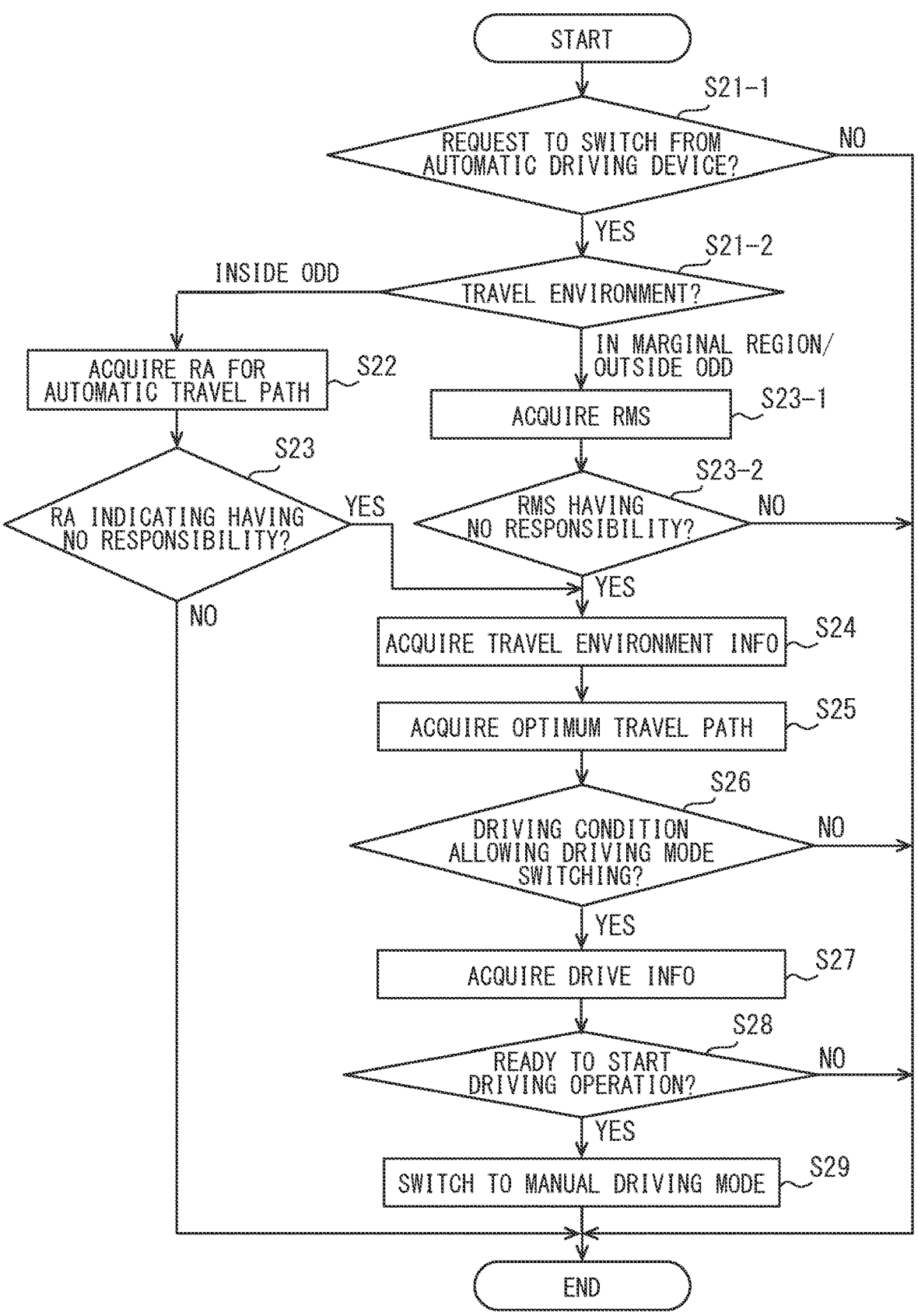
FIG. 27 is a diagram showing a process executed by a switching determination unit according to a fifteenth embodiment.

The driving switching unit 140 includes a switching determination unit 1541. The switching determination unit 1541 determines whether or not to switch the authority to perform driving operation of the host vehicle 1 by a process different from the switching determination unit of the foregoing embodiments. FIG. 27 shows a process executed by the switching determination unit 1541.

In FIG. 27, in S21-1, it is determined whether or not there is a switching request from the automatic driving device 120. When the determination result of S21-1 is YES, the process proceeds to S21-2. In S22-2, the travel environment in which the host vehicle 1 travels is determined. The travel environment here is an environment for determining an operational design domain (ODD).

Here, the ODD means a travel environment condition that is a prerequisite for operating the vehicle driving system 1500. The travel environment condition includes a road-related condition such as whether the road is a highway, a geographical condition such as urban or mountainous areas, an environmental condition such as weather, and other conditions (for example, speed limits). The ODD is pre-defined and stored in the automatic driving device 120. An example of the ODD includes a condition that the host vehicle 1 is traveling on a highway or a motorway having two or more lanes each way equipped with a median strip and a guardrail.

In S21-2, it is determined whether or not the travel environment of the host vehicle 1 is in the ODD and is not in the marginal region in the ODD. In other words, in S21-2, it is determined whether or not the travel environment of the host vehicle 1 is in a region within the ODD precluding the marginal region. The marginal region means an environment close to the boundary of the ODD.

Taking the case where the expressway is an operational design domain as a condition regarding the road, the road section in which the distance to the exit of the expressway is a certain distance or less determined in advance can be set as the marginal region. Further, it is also possible to predict the vehicle speed from the average vehicle speed or the like to the exit of the expressway, and set the marginal region when the arrival time to the exit of the expressway is less than a certain time based on the predicted vehicle speed. For the geographical condition, the environmental condition, and other conditions, if a situation that can be predicted not to satisfy those conditions in the near future can be set in advance, that situation is set as a marginal region.

When the determination result of S21-2 is within the ODD, the process proceeds to S23. Subsequent processing is the same as in the case of proceeding to S23 in FIG. 7. Therefore, the driving mode is switched to the manual driving mode when (i) the responsibility value RA is a value that indicates no responsibility, (ii) the driving situation is such that the driving can be switched, and (iii) the driver is ready to start the driving operation. Here, the responsibility value RA becomes smaller as the responsibility is lower. That is, the responsibility value RA becomes a smaller value as the possibility that the automatic driving characteristic of the host vehicle 1 deviates from the driving rule becomes smaller, and having no responsibility means that the possibility of deviating from the driving rule is low.

When the determination result of S21-2 is outside the marginal region or outside the ODD, the process proceeds to S23-1. Subsequent processing is the same as in the case of proceeding to S23-1 in FIG. 20. Therefore, the driving mode is switched to the manual driving mode when (i) the responsibility value RMS is a value that indicates no responsibility, (ii) the driving situation is such that the driving can be switched, and (iii) the driver is ready to start the driving operation. Here, the responsibility value RMS becomes smaller as the responsibility becomes lower. That is, the responsibility value RMS becomes a smaller value as the possibility that the assumed manual driving characteristic of the host vehicle 1 deviates from the driving rule is low; having no responsibility means that the possibility of deviating from the driving rule is low.

When it is outside the ODD, it is already an environment where automatic driving is difficult, so the driving mode should be switched quickly. In this fifteenth embodiment, if the travel environment is outside the ODD, it is determined whether the responsibility value RMS is a value that indicates having no responsibility; thereby it is not determined whether the responsibility value RA is a value that indicates having no responsibility. Therefore, it is possible to quickly switch the driving mode while suppressing the lack of smoothness when switching the driving mode.

Further, in the fifteenth embodiment, even when the travel environment is in the marginal region, it is determined whether the responsibility value RMS is a value that indicates having no responsibility, and it is not determined whether the responsibility value RA is a value that indicates having no responsibility. When the travel environment is in the marginal region, the travel environment may soon be outside the ODD, so the treatment is performed in the same manner as when the travel environment is outside the ODD.

On the other hand, when the travel environment is in the ODD which precludes the marginal region, it is less necessary to switch the driving mode quickly as compared with the case where the travel environment is in the marginal region or the travel environment is outside the ODD. Therefore, in the present embodiment, when the travel environment is within the ODD which precludes the marginal region, the condition that the responsibility value RA is a value that indicates having no responsibility is included in the condition for switching the driving mode. Therefore, it is possible to suppress the occurrence of behavior lacking in smoothness due to switching the driving mode when the travel environment is within the ODD which precludes the marginal region.

Although the embodiments have been described above, the disclosed technology is not limited to the above-described embodiments, and the following modifications are included in the present disclosure, and various modifications can be made without departing from the spirit of the present disclosure.

First Modification

In the eighth embodiment, the evaluation value "rate" is determined as the evaluation information, and the evaluation value "rate" is displayed on the display device 860. However, the evaluation information is not limited to the evaluation value "rate". The responsibility value RM itself may be displayed as evaluation information.

Further, the value of the evaluation value "rate" or the responsibility value RM may be indicated by a color, so as to indicate not the numerical value itself, but the magnitude of the numerical value.

Further, in the ninth embodiment, even if the path prediction unit 731 generates a plurality of travel paths "Pathds", the evaluation value "rate" is calculated only for one travel path "Pathd". However, the evaluation value "rate" or the responsibility value RM may be determined for all the travel paths. Then, a plurality of travel paths "Pathds" may be displayed on the display device 860 so as to overlap the road, and each displayed travel path "Pathd" may be displayed in a color indicating the magnitude of the evaluation value "rate" or the responsibility value RM corresponding to the travel path "Pathd". By doing so, the degree of responsibility due to manual driving will be displayed on a map.

Second Modification

The above describes an example in which the evaluation information evaluates whether or not the manual driving satisfies the switching permission condition on the manual driving side, and this evaluation information is displayed on the display device 860. However, in addition to this evaluation information, whether or not other conditions for switching the driving mode are satisfied may be displayed on the display device 860.

Third Modification

When the evaluation information is determined for each of a plurality of travel paths as in the first modification, the evaluation information may be used as follows. That is, when the accelerator or the steering wheel is operated in a direction in which the evaluation information deteriorates, a reaction force may be generated in the accelerator pedal or the steering wheel.

Fourth Modification

In addition to the condition for determining that the driver is ready to drive, whether or not the amount of operation of the steering wheel by the driver is the amount of operation that matches the direction in which the host vehicle 1 is currently traveling may be added. This can prevent an occurrence of the following problem. That is, suppose a situation where the amount of operation of the steering wheel by the driver is the amount of operation for driving the host vehicle 1 straight even though the vehicle is traveling on a curve. Under such a situation, the problem may arise in which the traveling direction of the host vehicle 1 may suddenly change due to the switching of the driving mode.

Fifth Modification

Both or one of (i) the determination whether the driving situation is switchable and (ii) the determination whether the driver is ready to start the driving operation may not need to be added to a condition for determining whether to allow driving switching.

Sixth Modification

In the fifteenth embodiment, when the travel environment is the marginal region, it is determined whether the responsibility value RMS is a value that indicates having no responsibility, but it is not determined whether the responsibility value RA is a value that indicates having no responsibility. However, when the travel environment is the marginal region, whether the responsibility value RMS is a value that indicates having no responsibility or the responsibility value RA is a value that indicates having no responsibility may be included in the switching condition. In the embodiment of the fifteenth embodiment, the switching condition may include that the responsibility value RMS is a value that indicates having no responsibility even when the travel environment is within the ODD which precludes the marginal region.

Seventh Modification

Suppose a case where the mode is switched from the automatic driving mode to the manual driving mode by the request from the automatic driving device 120. In such a case, immediately after switching to the manual driving mode, the driver may have a lower driving ability than the driving ability during continuous driving operation due to reasons such as insufficient awareness of the surrounding environment. Note that the continuous driving operation means a state in which manual driving is performed all the time. It takes a while for the driving ability of the driver to return to the driving ability during continuous driving operation after the driving mode is switched to the manual driving mode.

Therefore, when calculating the responsibility value RMS, the responsibility value calculation unit 1132 may consider the driving ability return time up to the time when the driving ability of the driver becomes the driving ability during continuous driving operation in cases of switching from the automatic driving mode to the manual driving mode.

Specifically, while the elapsed time after switching the driving mode is shorter than the driving ability return time, the responsibility value RMS is calculated assuming that at least one of the driver's recognition time, the determination time, and the operation time is longer than the elapsed time having exceeded the driving ability return time.

The driving ability return time can be, for example, two seconds. This two seconds is an example, and the driving ability return time is set in advance based on an experiment or the like. Further, the driving ability return time may be set for each driver, or only one may be set regardless of who the driver is.

Eighth Modification

When switching from the automatic driving mode to the manual driving mode by the request from the automatic driving device 120, the change of the driving mode may be announced by using one or both of the display devices 1020 and 1310 and the speaker.

The period of time from the start of the notice to the switching of the driving mode is set as an advance notice time. The advance notice time is set in advance. It can also be said that the advance notice time is the time required to transfer the driving authority.

When it can be predicted that the travel environment will be outside the ODD, the automatic driving device 120 determines whether or not this advance notice time can be secured. When it is determined that the advance notice time can be secured, the driver is notified of switching the driving mode, at the latest, earlier than the time when it is predicted that the driving mode needs to be switched to the manual driving mode, by the advance notice time.

However, depending on the travel environment, it may happen that the preset advance notice time cannot be secured, so it is expected that the actual advance notice time will be shorter than the set advance notice time. The shorter the actual advance notice time, the higher the risk that the driver will not be fully aware of the surrounding conditions at the time of switching the driving mode.

Therefore, the responsibility value calculation unit 1132 may calculate the responsibility value RMS in consideration of the advance notice time from the notice of the change of the driving mode to the change of the driving mode, in addition to the driving ability return time.

As a method of calculating the responsibility value RMS in consideration of the advance notice time, for example, a method of lengthening the driving ability return time as the actual advance notice time is shorter than the preset advance notice time can be considered.

Ninth Modification

The embodiment in which the driving mode is switched from the manual driving mode to the automatic driving mode and the embodiment in which the driving mode is switched from the automatic driving mode to the manual driving mode can be combined. For example, any of the eleventh or twelfth embodiments and the thirteenth to fifteenth embodiments can be combined.

Tenth Modification

The constituent elements described in the present disclosure as being implemented by a processor can also be referred to as a control unit. The control unit and the method described in the present disclosure may be implemented by a special purpose computer configuring a processor programmed to perform one or more functions embodied by a computer program. Alternatively, the control unit and the method described in the present disclosure may be implemented by a dedicated hardware logic circuit. Alternatively, the control unit and the method described in the present disclosure may be implemented by one or more special purpose computers configured by a combination of a processor executing a computer program and one or more hardware logic circuits. The hardware logic circuits may be, for example, ASIC or FPGA.

The storage medium for storing the computer program is not limited to ROM. Alternatively, the computer program may be stored in a computer-readable, non-transitory tangible storage medium as instructions to be executed by a computer. For example, the program may be stored in a flash memory.

For reference to further explain features of the present disclosure, the description is added as follows.

Techniques are known to determine whether to allow switching between manual driving and automatic driving. There is disclosed an automatic driving device that allows switching to automatic driving when the difference between the manual driving operation amount by the driver during manual driving and the automatic driving operation amount calculated by the automatic driving calculation unit is equal to or less than a threshold value.

There is disclosed in WO 2018/115963 A2 a device that estimates an automatic driving characteristic as a characteristic in a navigation operation of a target vehicle, compares the characteristic with a driving rule, and determines execution of the navigation operation that complies with the driving rule. The disclosures of WO 2018/115963 A2 are incorporated herein by reference.

When a driver who drives a vehicle equipped with the above automatic driving device wants to switch from manual driving to automatic driving, the driver himself may adjust the manual driving operation amount so as to match the automatic driving operation amount. If the driver tries to adjust the manual driving operation amount to match the automatic driving operation amount, the driver may be distracted by adjusting the manual driving operation amount to the automatic driving operation amount. Further, for example, when the switching from the manual driving to the automatic driving is executed in a state where the conditions are not satisfied, the manual driving operation amount is suddenly changed to the automatic driving operation amount according to the driving rule. The behavior before and after switching may lack smoothness.

It is thus desired for the present disclosure to provide a vehicle driving switching device, a vehicle driving system, and a vehicle driving switching method that smoothly switches between manual driving and automatic driving.

Aspects of the present disclosure described herein are set forth in the following clauses.

According to a first aspect of the present disclosure, a vehicle driving switching device is provided to switch between (i) automatic driving by an automatic driving device which a vehicle is equipped with and (ii) manual driving by a driver of the vehicle. The vehicle driving switching device includes a driving rule determination acquisition unit and a driving switching unit, and a switching determination unit. The driving rule determination acquisition unit is configured to acquire driving rule determination information under the automatic driving, the driving rule determination information under the automatic driving being information that indicates a determination result of comparison between (i) a driving rule and (ii) an automatic driving characteristic being a characteristic of a host vehicle being the vehicle equipped with the automatic driving device when the host vehicle travels by the automatic driving on a travel path generated by the automatic driving device. The driving switching unit is configured to perform a driving mode switching of switching a driving mode between an automatic driving mode in which the automatic driving is performed and a manual driving mode in which the manual driving is performed. The switching determination unit is configured to permit the driving mode switching by the driving switching unit based on condition that the driving rule determination information under the automatic driving acquired by the driving rule determination acquisition unit indicates that the automatic driving characteristic complies with the driving rule.

This driving switching device acquires the driving rule determination information when the host vehicle runs by automatic driving. When the driving rule determination information indicates that the automatic driving characteristic complies with the driving rule, the driving witching is permitted. Therefore, when the driving mode is switched, the condition indicating that the automatic driving characteristic complies with the driving rule is satisfied. Therefore, the driving mode can be switched smoothly.

According to a second aspect of the present disclosure, a vehicle driving switching device is provided to switch between (i) automatic driving by an automatic driving device which a vehicle is equipped with and (ii) manual driving by a driver of the vehicle. The vehicle driving switching device includes a driving rule determination acquisition unit, a driving switching unit, and a switching determination unit. The driving rule determination acquisition unit is configured to acquire driving rule determination information under an assumed manual driving, the driving rule determination information under the assumed manual driving being information that indicates a determination result of comparison between (i) a driving rule and (ii) an assumed manual driving characteristic being a characteristic of a host vehicle being the vehicle equipped with the automatic driving device when it is assumed that the host vehicle travels by the manual driving on a travel path generated by the automatic driving device. The driving switching unit is configured to perform a driving mode switching of switching a driving mode between an automatic driving mode in which the automatic driving is performed and a manual driving mode in which the manual driving is performed. The switching determination unit is configured to permit the driving mode switching by the driving switching unit from the automatic driving mode to the manual driving mode based on condition that the driving rule determination information under the assumed manual driving indicates that the assumed manual driving characteristic is assumed to comply with the driving rule.

According to this vehicle driving switching device, in order to determine whether or not to allow the driving switching from the automatic driving mode to the manual driving mode, it is determined whether the driving rule determination information under the assuming manual driving indicates that the assumed manual driving characteristic is assumed to comply with the driving rule. This determination is made before switching to the manual driving mode. That is, it is determined whether or not the driving rule determination information in the case where the manual driving is assumed in the state where the automatic driving mode is being executed indicates that the assumed manual driving characteristic is assumed to comply with the driving rule.

Therefore, when switching to the manual driving mode, it is possible to suppress the deviation from the driving rule due to the manual driving, and it is also possible to suppress the behavior lacking smoothness when switching to the manual driving mode.

According to a third aspect of the present disclosure, a vehicle driving switching device is provided to switch between (i) automatic driving by an automatic driving device, which a vehicle is equipped with, and (ii) manual driving by a driver of the vehicle. The vehicle driving switching device includes an automatic driving rule determination acquisition unit, a manual driving rule determination acquisition unit, and a driving switching unit. The automatic driving rule determination acquisition unit is configured to acquire automatic driving rule determination information under the automatic driving, the driving rule determination information under the automatic driving being information that indicates a determination result of comparison between (i) a driving rule and (ii) an automatic driving characteristic being a characteristic of a host vehicle being the vehicle equipped with the automatic driving device when the host vehicle travels by the automatic driving. The manual driving rule determination acquisition unit is configured to acquire the driving rule determination information under the manual driving, the driving rule determination information under the manual driving being information that indicates a determination result of comparison between (i) the driving rule and (ii) a manual driving characteristic being a characteristic of the host vehicle when the host vehicle travels by the manual driving. The driving switching unit is configured to perform a driving mode switching of switching between the automatic driving and the manual driving; and a switching determination unit configured to permit the driving mode switching by the driving switching unit from a first driving of the automatic driving and the manual driving to a second driving of the automatic driving and the manual driving based on condition that the driving rule determination information under the second driving indicates that the second driving complies with the driving rule.

In addition, according to a fourth aspect of the present disclosure, a vehicle driving system is provided to include the vehicle driving switching device according to the first aspect, and the automatic driving device which the vehicle is equipped with. The automatic driving device includes a path generation unit, and a driving rule determination generation unit. The path generation unit is configured to sequentially generate a travel path to be traveled next in order for a host vehicle, which is the vehicle equipped with the automatic driving device, to continue traveling. The driving rule determination generation unit is configured to sequentially generate driving rule determination information under an automatic driving, the driving rule determination under the automatic driving being information indicating a determination result of comparison between (i) a driving rule and (ii) an automatic driving characteristic being a characteristic of the host vehicle when the host vehicle travels by the automatic driving on a travel path generated by the path generation unit. Herein, the path generation unit is further configured to generate the travel path that causes the host vehicle to make an emergency stop or an emergency deceleration in response to the driving rule determination information under the automatic driving generated by the driving rule determination generation unit indicating that the automatic driving characteristic deviates from the driving rule.

In this vehicle driving system, in the automatic driving mode, when the driving rule determination information indicates that the automatic driving characteristic deviates from the driving rule, a travel path for urgently stopping or decelerating the host vehicle is generated. Therefore, during normal driving in the automatic driving mode, the automatic driving characteristic complies with the driving rule. Therefore, even when switching from the automatic driving mode to the manual driving mode, the automatic driving characteristic is in a state of complying with the driving rule. Therefore, the driving mode can be switched smoothly.

Further, according to a fifth aspect of the present disclosure, a vehicle driving switching method is provided to be executed by the vehicle driving switching device according to the first aspect. The vehicle driving switching method switches between (i) automatic driving by an automatic driving device with which a vehicle is equipped and (ii) manual driving by a driver of the vehicle. The vehicle driving switching method includes an acquiring step and a permitting step. The acquiring step is acquiring driving rule determination information under the automatic driving, the driving rule determination information under the automatic driving being information that indicates a determination result of comparison between (i) a driving rule and (ii) an automatic driving characteristic being a characteristic of a host vehicle being the vehicle equipped with the automatic driving device when the host vehicle travels by the automatic driving on a travel path generated by the automatic driving device. The permitting step is permitting a driving mode switching by a driving switching unit of switching a driving mode between an automatic driving mode in which the automatic driving is performed and a manual driving mode in which the manual driving is performed based on condition that the driving rule determination information under the automatic driving indicates that the automatic driving characteristic complies with the driving rule.

Further, according to a sixth aspect of the present disclosure, a vehicle driving switching method is provided to be executed by the vehicle driving switching device according to the second aspect. The vehicle driving switching method switches between (i) automatic driving by an automatic driving device with which a vehicle is equipped and (ii) manual driving by a driver of the vehicle. The vehicle driving switching method includes an acquiring step and a permitting step. The acquiring step is acquiring driving rule determination information under an assumed manual driving, the driving rule determination information under the assumed manual driving being information that indicates a determination result of comparison between (i) a driving rule and (ii) an assumed manual driving characteristic being a characteristic of a host vehicle being the vehicle equipped with the automatic driving device when it is assumed that the host vehicle travels by the manual driving on a travel path generated by the automatic driving device. The permitting step is permitting a driving mode switching by a driving switching unit from the automatic driving mode to the manual driving mode based on condition that the driving rule determination information under the assumed manual driving indicates that the assumed manual driving characteristic is assumed to comply with the driving rule.

What is claimed is:

1. A vehicle driving system that switches between (i) automatic driving by an automatic driving device which a vehicle is equipped with and (ii) manual driving by a driver of the vehicle, the vehicle driving system comprising:

a driving rule determination acquisition unit configured to acquire driving rule determination information under the automatic driving, the driving rule determination information under the automatic driving being information that indicates a determination result of comparison between (i) a driving rule and (ii) an automatic driving characteristic being a characteristic of a host vehicle being the vehicle equipped with the automatic driving device when the host vehicle travels by the automatic driving on a travel path generated by the automatic driving device;

a driving switching unit configured to perform a driving mode switching of switching a driving mode between an automatic driving mode in which the automatic driving is performed and a manual driving mode in which the manual driving is performed;

a switching determination unit configured to permit the driving mode switching by the driving switching unit based on condition that the driving rule determination information under the automatic driving acquired by the driving rule determination acquisition unit indicates that the automatic driving characteristic complies with the driving rule; and an evaluation information determination unit sequentially determining evaluation information for evaluating a manual driving under execution during the manual driving; and a display device displaying thereon the evaluation information determined by the evaluation information determination unit, wherein the switching determination unit is further configured to switch from the manual driving mode to the automatic driving mode by considering (i) an operation amount of the manual driving mode and an operation amount of the automatic driving mode and (ii) an evaluation value indicating separation of the operation amount of the manual driving from the operation amount of the automatic driving.

2. The vehicle driving system according to claim 1, wherein:

the driving rule determination acquisition unit is further configured to acquire the driving rule determination information under the manual driving, the driving rule determination information under the manual driving being information that indicates a determination result of comparison between (i) the driving rule and (ii) a manual driving characteristic being the characteristic of the host vehicle when the host vehicle travels by the manual driving; and the switching determination unit is further configured to permit the driving mode switching by the driving switching unit based on condition that (i) the driving rule determination information under the automatic driving indicates that the automatic driving characteristic complies with the driving rule and (ii) the driving rule determination information under the manual driving indicates that the manual driving characteristic complies with the driving rule.

3. The vehicle driving system according to claim 2, wherein the evaluation information determination unit determines the evaluation information, which evaluates whether or not the manual driving under execution satisfies a switching permission condition on a manual driving side, in response to the switching permission condition being satisfied, the driving rule determination information under the manual driving indicates that the manual driving characteristic complies with the driving rule, and the display device is configured to display the evaluation information determined by the evaluation information determination unit toward the driver.

4. The vehicle driving system according to claim 3, wherein:

the evaluation information determination unit is further configured to:

calculate the evaluation value obtained by correcting a value indicating a difference, based on the driving rule determination information under the manual driving, the difference being between a second behavior-related value related to a behavior of the host vehicle during the manual driving and a first behavior-related value when the automatic driving is performed instead of the manual driving; and determine the evaluation information to be displayed for the driver based on the calculated evaluation value.

5. The vehicle driving system according to claim 4, wherein:

each of the first behavior-related value and the second behavior-related value includes an accelerator opening and a steering operation amount.

6. The vehicle driving system according to claim 4, wherein:

the second behavior-related value during the manual driving is a travel path predicted based on an operation amount by which the driver operates a driving operation device in the host vehicle in order to drive the host vehicle; and the first behavior-related value when the automatic driving is performed is a travel path generated by the automatic driving device.

7. The vehicle driving system according to claim 4, wherein:

the evaluation information determination unit is further configured to display the evaluation value as the evaluation information on the display device.

8. The vehicle driving system according to claim 2, further comprising: a display device configured to display, during the manual driving, a predicted travel path generated by the automatic driving device toward the driver, the predicted travel path being predicted when the automatic driving is to be performed instead of the manual driving.

9. The vehicle driving system according to claim 1, wherein:

the switching determination unit is further configured not to permit the driving mode switching in response to (i) a road on which the host vehicle travels is a preset driving section where driving operation is difficult, or (ii) a driving behavior of the host vehicle being in a sudden behavior state.

10. The vehicle driving system according to claim 1, wherein:

the switching determination unit contains a fact that the driver is ready to perform a driving operation, into a switching condition for permitting the driver to switch from the automatic driving mode to the manual driving mode.

11. The vehicle driving system according to claim 1, wherein the automatic driving device further comprises:

a path generation unit configured to sequentially generate a travel path to be traveled next in order for a host vehicle, which is the vehicle equipped with the automatic driving device, to continue traveling; and a responsibility value calculation unit configured to sequentially generate driving rule determination information under an automatic driving, the driving rule determination information under the automatic driving being information indicating a determination result of comparison between (i) a driving rule and (ii) an automatic driving characteristic being a characteristic of the host vehicle when the host vehicle travels by the automatic driving on a travel path generated by the path generation unit, wherein:

the path generation unit is further configured to generate the travel path that causes the host vehicle to make an emergency stop or an emergency deceleration in response to the driving rule determination information under the automatic driving generated by the responsibility value calculation unit indicating that the automatic driving characteristic deviates from the driving rule.

12. A vehicle driving system that switches between (i) automatic driving by an automatic driving device which a vehicle is equipped with and (ii) manual driving by a driver of the vehicle, the vehicle driving system comprising:

a driving rule determination acquisition unit configured to acquire driving rule determination information under an assumed manual driving, the driving rule determination information under the assumed manual driving being information that indicates a determination result of comparison between (i) a driving rule and (ii) an assumed manual driving characteristic being a characteristic of a host vehicle being the vehicle equipped with the automatic driving device when it is assumed that the host vehicle travels by the manual driving on a travel path generated by the automatic driving device;

a driving switching unit configured to perform a driving mode switching of switching a driving mode between an automatic driving mode in which the automatic driving is performed and a manual driving mode in which the manual driving is performed; and a switching determination unit configured to permit the driving mode switching by the driving switching unit from the automatic driving mode to the manual driving mode based on condition that the driving rule determination information under the assumed manual driving indicates that the assumed manual driving characteristic is assumed to comply with the driving rule;

an evaluation information determination unit sequentially determining evaluation information for evaluating a manual driving under execution during the manual driving; and a display device displaying thereon the evaluation information determined by the evaluation information determination unit, wherein the switching determination unit is further configured to switch from the automatic driving mode to the manual driving mode by considering (i) an operation amount of the manual driving mode and an operation amount of the automatic driving mode and (ii) an evaluation value indicating separation of the operation amount of the manual driving from the operation amount of the automatic driving.

13. The vehicle driving system according to claim 12, wherein:

the driving rule determination acquisition unit is further configured to acquire the driving rule determination information under the automatic driving, the driving rule determination information under the automatic driving being information that indicates a determination result of comparison between (i) the driving rule and (ii) an automatic driving characteristic being the characteristic of the host vehicle when the host vehicle travels by the automatic driving on the travel path generated by the automatic driving device; and the switching determination unit is further configured to permit the driving mode switching by the driving switching unit from the automatic driving mode to the manual driving mode based on condition that (i) the driving rule determination information under the assumed manual driving indicates that the assumed manual driving characteristic is assumed to comply with the driving rule and (ii) the driving rule determination information under the automatic driving indicates that the automatic driving characteristic complies with the driving rule.

14. The vehicle driving system according to claim 13, wherein:

in response to the driving rule determination information under the assumed manual driving indicating that the assumed manual driving characteristic is assumed to comply with the driving rule, the switching determination unit is further configured to assume that the driving rule determination information under the automatic driving indicates that the automatic driving characteristic complies with the driving rule.

15. The vehicle driving system according to claim 12, wherein:

in response to (i) switching the driving mode from the automatic driving mode to the manual driving mode based on a switching request from the automatic driving device and (ii) a travel environment of the host vehicle being outside an operational design domain in which the automatic driving device operates, the switching determination unit is further configured (i) to contain the condition that the driving rule determination information under the assumed manual driving indicates that the assumed manual driving characteristic is assumed to comply with the driving rule, into a switching condition from the automatic driving mode by the driving switching unit to the manual driving mode, but (ii) not to contain whether or not the driving rule determination information under the automatic driving indicates that an automatic driving characteristic complies with the driving rule, into the switching condition from the automatic driving mode to the manual driving mode, the automatic driving characteristic being the characteristic of the host vehicle when the host vehicle travels by the automatic driving.

16. The vehicle driving system according to claim 12, wherein:

in response to (i) switching the driving mode from the automatic driving mode to the manual driving mode based on a switching request from the automatic driving device and (ii) a travel environment of the host vehicle being in a marginal region inside an operational design domain in which the automatic driving device operates, the switching determination unit is further configured to contain the condition that the driving rule determination information under the assumed manual driving indicates that the assumed manual driving characteristic is assumed to comply with the driving rule, into a switching condition from the automatic driving mode by the driving switching unit to the manual driving mode.

17. The vehicle driving system according to claim 16, wherein:

the driving rule determination acquisition unit is further configured to acquire the driving rule determination information under the automatic driving, the driving rule determination information under the automatic driving being information that indicates a determination result of comparison between (i) the driving rule and (ii) an automatic driving characteristic being the characteristic of the host vehicle being the vehicle equipped with the automatic driving device when the host vehicle travels by the automatic driving on a travel path generated by the automatic driving device;

in response to (i) switching the driving mode from the automatic driving mode to the manual driving mode based on the switching request from the automatic driving device and (ii) the travel environment of the host vehicle being in the marginal region inside the operational design domain in which the automatic driving device operates, the switching determination unit is further configured to contain (i) the condition that the driving rule determination information under the assumed manual driving indicates that the assumed manual driving characteristic is assumed to comply with the driving rule, and (ii) the driving rule determination information under the automatic driving indicates that the automatic driving characteristic complies with the driving rule, into the switching condition from the automatic driving mode to the manual driving mode.

18. The vehicle driving system according to claim 12, wherein:

the driving rule determination acquisition unit is further configured to acquire the driving rule determination information under the automatic driving, the driving rule determination information under the automatic driving being information that indicates a determination result of comparison between (i) the driving rule and (ii) an automatic driving characteristic being the characteristic of the host vehicle when the host vehicle travels by the automatic driving on the travel path generated by the automatic driving device; and in response to (i) switching the driving mode from the automatic driving mode to the manual driving mode based on a switching request from the automatic driving device, and (ii) a travel environment of the host vehicle being inside an operational design domain in which the automatic driving device operate but outside a marginal region inside the operational design domain, the switching determination unit is further configured to contain condition that the driving rule determination information under the automatic driving indicates that the automatic driving characteristic complies with the driving rule, into a switching condition from the automatic driving mode to the manual driving mode by the driving switching unit.

19. The vehicle driving system according to claim 12, wherein:

the driving rule determination acquisition unit is further configured to acquire the driving rule determination information under the assumed manual driving, which considers a driving ability return time to when a driving ability of the driver becomes the driving ability during continuous driving, in response to the automatic driving mode being switched to the manual driving mode; and in response to switching the driving mode from the automatic driving mode to the manual driving mode based on a switching request from the automatic driving device, the switching determination unit is further configured to permit the driving mode switching by the driving switching unit from the automatic driving mode to the manual driving mode based on condition that the driving rule determination information considering the driving ability return time indicates that the assumed manual driving characteristic is assumed to comply with the driving rule.

20. The vehicle driving system according to claim 19, wherein:

the driving rule determination acquisition unit is further configured to acquire the driving rule determination information under the assumed manual driving, which considers an advance notice time to urge the driver to prepare for the manual driving in response to the automatic driving mode being switched to the manual driving mode, in addition to the driving ability return time; and in response to switching the driving mode from the automatic driving mode to the manual driving mode based on the switching request from the automatic driving device, the switching determination unit is further configured to permit the driving mode switching by the driving switching unit from the automatic driving mode to the manual driving mode based on condition that the driving rule determination information considering the driving ability return time and the advance notice time indicates that the assumed manual driving characteristic is assumed to comply with the driving rule.

21. The vehicle driving system according to claim 12, wherein:

the switching determination unit is further configured not to permit the driving mode switching in response to (i) a road on which the host vehicle travels is a preset driving section where driving operation is difficult, or (ii) a driving behavior of the host vehicle being in a sudden behavior state.

22. The vehicle driving system according to claim 12, wherein:

the switching determination unit contains a fact that the driver is ready to perform a driving operation, into a switching condition for permitting the driver to switch from the automatic driving mode to the manual driving mode.

23. A vehicle driving system comprising:

the vehicle driving system according to claim 1; and the automatic driving device.

24. A vehicle driving system comprising:

the vehicle driving system according to claim 12; and the automatic driving device.

25. A computer-implemented vehicle driving switching method performed by a processor to switch between (i) automatic driving by an automatic driving device with which a vehicle is equipped and (ii) manual driving by a driver of the vehicle, the vehicle driving switching method comprising:

acquiring driving rule determination information under the automatic driving, the driving rule determination information under the automatic driving being information that indicates a determination result of comparison between (i) a driving rule and (ii) an automatic driving characteristic being a characteristic of a host vehicle being the vehicle equipped with the automatic driving device when the host vehicle travels by the automatic driving on a travel path generated by the automatic driving device; and permitting a driving mode switching by a driving switching unit of switching a driving mode between an automatic driving mode in which the automatic driving is performed and a manual driving mode in which the manual driving is performed based on condition that the driving rule determination information under the automatic driving indicates that the automatic driving characteristic complies with the driving rule;

sequentially determining evaluation information for evaluating a manual driving under execution during the manual driving; and displaying the evaluation information on a display device, wherein switching of the manual driving mode to the automatic driving mode is performed by considering (i) an operation amount of the manual driving mode and an operation amount of the automatic driving mode and (ii) an evaluation value indicating separation of the operation amount of the manual driving from the operation amount of the automatic driving.

26. The vehicle driving system according to claim 1, further comprising:

a memory; and a processor communicably coupled to the memory, the processor being configured to implement the driving rule determination acquisition unit, the driving switching unit, and the switching determination unit.

27. The vehicle driving system according to claim 12, further comprising:

a memory; and a processor communicably coupled to the memory, the processor being configured to implement the driving rule determination acquisition unit, the driving switching unit, and the switching determination unit.

28. The vehicle driving system according to claim 1, wherein the driving rule comprises a vertical speed rule, a horizontal speed rule, a driving priority rule, a traffic light based rule, a traffic sign based rule, a route priority rule, a local traffic rule, or a combination thereof.

29. A vehicle driving system that switches between (i) automatic driving by an automatic driving device which a vehicle is equipped with and (ii) manual driving by a driver of the vehicle, the vehicle driving system comprising:

a driving rule determination acquisition unit configured to acquire driving rule determination information under the automatic driving, the driving rule determination information under the automatic driving being information that indicates a determination result of comparison between (i) a driving rule and (ii) an automatic driving characteristic being a characteristic of a host vehicle being the vehicle equipped with the automatic driving device when the host vehicle travels by the automatic driving on a travel path generated by the automatic driving device;

a driving switching unit configured to perform a driving mode switching of switching a driving mode between an automatic driving mode in which the automatic driving is performed and a manual driving mode in which the manual driving is performed;

a switching determination unit configured to permit the driving mode switching to the automatic driving by the driving switching unit based on condition that the driving rule determination information under the automatic driving acquired by the driving rule determination acquisition unit indicates that the automatic driving characteristic complies with the driving rule; and a responsibility value calculation unit configured to sequentially calculate the responsibility value when the automatic driving device performs the automatic driving;

an evaluation information determination unit sequentially determining evaluation information for evaluating a manual driving under execution during the manual driving; and a display device displaying thereon the evaluation information determined by the evaluation information determination unit, wherein the switching determination unit is further configured to switch from the manual driving mode to the automatic driving mode by considering (i) an operation amount of the manual driving mode and an operation amount of the automatic driving mode and (ii) an evaluation value indicating separation of the operation amount of the manual driving from the operation amount of the automatic driving.

\* \* \* \* \*